US012749709B2

(12) United States Patent
Nguyen et al.

(10) Patent No.: US 12,749,709 B2
(45) Date of Patent: Sep. 29, 2026

(54) ELECTROLYTE FOR MAGNESIUM ION BATTERIES

(71) Applicant: AGENCY FOR SCIENCE, TECHNOLOGY AND RESEARCH, Singapore (SG)

(72) Inventors: Dan Thien Nguyen, Singapore (SG); Zhi Wei Seh, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 1161 days.

(21) Appl. No.: 17/780,021

(22) PCT Filed: Dec. 4, 2020

(86) PCT No.: PCT/SG2020/050721

§ 371 (c)(1),
(2) Date: May 25, 2022

(87) PCT Pub. No.: WO2021/112771

PCT Pub. Date: Jun. 10, 2021

(65) Prior Publication Data

US 2022/0416301 A1 Dec. 29, 2022

(30) Foreign Application Priority Data

Dec. 4, 2019 (SG) ............................ 10201911676S

(51) Int. Cl.
*H01M 10/0567* (2010.01)
*H01M 10/054* (2010.01)
(Continued)

(52) U.S. Cl.
CPC ..... *H01M 10/0567* (2013.01); *H01M 10/054* (2013.01); *H01M 10/0569* (2013.01);
(Continued)

(58) Field of Classification Search
CPC ........... H01M 10/054; H01M 10/0567; H01M 10/0568; H01M 10/0569;
(Continued)

(56) References Cited

U.S. PATENT DOCUMENTS

2009/0068568 A1 3/2009 Yamamoto et al.
2013/0337328 A1* 12/2013 Yamamoto ............ H01M 4/587 429/220

FOREIGN PATENT DOCUMENTS

CN 1097713368 A 5/2019

OTHER PUBLICATIONS

International Search Report for PCT International Application No. PCT/SG2020/050721, mailed Feb. 24, 2021, 3 pages.

(Continued)

*Primary Examiner* — Lingwen R Zeng
(74) *Attorney, Agent, or Firm* — Womble Bond Dickinson (US) LLP

(57) ABSTRACT

There is a liquid electrolyte composition comprising: i) a magnesium salt comprising a trifluoromethane sulfonate anion; ii) an additive comprising an organic halide salt, an inorganic halide salt or a mixture thereof; and iii) a solvent comprising one or more ethers, wherein the organic halide salt comprises a halide anion and a cation selected from an optionally substituted quaternary ammonium or a three to nine membered N-heterocyclic cation, and the cation comprises at least one protonated nitrogen capable of dissociating the trifluoromethane sulfonate anion from the magnesium salt, and wherein the total concentration of cations of the inorganic halide salt and magnesium ions of the magnesium salt divided by the concentration of anions of the inorganic halide salt is greater than 1 in the electrolyte composition. There is further provided an electrochemical cell comprising a) a positive electrode; b) a magnesium (Continued)

negative electrode; and c) the electrolyte composition as described herein, wherein the positive electrode and the magnesium negative electrode are in fluid communication with the electrolyte.

19 Claims, 18 Drawing Sheets

(51) Int. Cl.
*H01M 10/0569* (2010.01)
*H01M 4/02* (2006.01)
*H01M 4/38* (2006.01)
*H01M 10/0568* (2010.01)

(52) U.S. Cl.
CPC ...... *H01M 2004/027* (2013.01); *H01M 4/381* (2013.01); *H01M 10/0568* (2013.01); *H01M 2300/0028* (2013.01); *H01M 2300/0057* (2013.01); *Y02E 60/10* (2013.01)

(58) Field of Classification Search
CPC ... H01M 2004/027; H01M 2300/0028; H01M 2300/0057; H01M 4/381; Y02E 60/10
See application file for complete search history.

(56) References Cited

OTHER PUBLICATIONS

Yang, Yuanying et al., High Active Magnesium Trifluoromethanesulfonate-Based Electrolytes for Magnesium-Sulfur Batteries, Applied Materials & Interfaces, Feb. 13, 2019, vol. 11, pp. 9062-9072.

Written Opinion for PCT International Application No. PCT/SG2020/050721, mailed Feb. 24, 2021, 4 pages.

International Preliminary Report on Patentability for PCT International Application No. PCT/SG2020/050721, mailed May 17, 2021, 5 pages.

* cited by examiner

ELECTROLYTE FOR MAGNESIUM ION BATTERIES

This application is a US national phase application under 35 USC Section 371 of International Application No. PCT/SG2020/050721, filed Dec. 4, 2020, which claims the benefit of priority of Singapore patent application No. 10201911676S, filed on 4 Dec. 2019, its contents having been incorporated by reference in its the entirety.

This application claims the benefit of priority of Singapore patent application No. 10201911676S, filed on 4 Dec. 2019, its contents being hereby incorporated by reference in its entirety.

TECHNICAL FIELD

The present disclosure relates to an electrolyte system, in particular, to an electrolyte for use in magnesium ion batteries.

BACKGROUND ART

The rapid development of electrical and electronic devices in recent years has renewed interest in the development of energy storage such as rechargeable batteries. Currently, lithium is relied upon heavily as an energy source for such electronic devices. However, there is concern that increasing demands for such lithium-ion batteries may further deplete the limited supply of lithium in the Earth's crust.

Various technologies have been researched and developed as alternatives to lithium ion batteries in recent years. Magnesium ion batteries have shown great potential as an alternative energy source due to its high natural abundance, high volumetric capacity, low reduction potential, and low cost. However, the development of such batteries has been hampered by poor performance of current electrolyte systems. Due to the reactivity of magnesium-based electrodes, organic solvents are typically employed in electrolyte systems for magnesium ion batteries. While several magnesium salts have demonstrated good solubility in such organic solvents, electrolytes comprising these magnesium salts alone often result in poor Coulombic efficiency and poor reversibility of magnesium deposition. As such, the performance of magnesium-ion batteries has been regarded to be poorer than the current lithium-ion batteries.

Magnesium trifluoromethanesulfonate ($Mg(OTf)_2$) is a promising salt for Mg electrolyte. However, $Mg(OTf)_2$-based electrolyte has been rarely reported due to low solubility of $Mg(OTf)_2$ in ether solvents. Enhancing solubility of $Mg(OTf)_2$ in ether solvent is essential to obtain a high performance electrolyte system for Mg-ion batteries.

Accordingly, there is a need to provide an improvement for magnesium-ion batteries which are able to overcome or at least ameliorate the disadvantages discussed above. In particular, it is an object to provide an electrolyte system for magnesium ion batteries which allows efficient plating and stripping of magnesium and demonstrates improved Coulombic efficiency.

SUMMARY

In one aspect, there is provided a liquid electrolyte composition comprising:

i) a magnesium salt comprising a trifluoromethane sulfonate anion;

ii) an additive selected from an organic halide salt, an inorganic halide salt or a mixture thereof; and iii) a solvent comprising one or more ethers, wherein the organic halide salt comprises a halide anion and a cation selected from an optionally substituted quaternary ammonium or a three to nine membered N-heterocyclic cation, and the cation comprises at least one protonated nitrogen capable of dissociating the trifluoromethane sulfonate anion from the magnesium salt, and wherein the total concentration of cations of the inorganic halide salt and magnesium ions of the magnesium salt divided by the concentration of anions of the inorganic halide salt is greater than 1 in the electrolyte composition.

The presence of the additive may advantageously facilitate the dissociation of magnesium trifluoromethane sulfonate ($Mg(OTf)_2$), thereby improving its solubility in an ether solvent.

The improvement in solubility may advantageously lead to superior Coulombic efficiency (e.g. greater than 99%), and areal capacity (e.g. larger than 5 $mAh/cm^2$).

In another aspect, there is provided a liquid electrolyte composition consisting essentially of:

i) a magnesium trifluoromethanesulfonate;

ii) 1-ethyl-3-methylimidazolium chloride, tetrabutylammonium chloride, or a mixture thereof; and iii) a solvent comprising 1,2-dimethoxyethane.

In another aspect, there is provided a liquid electrolyte composition consisting essentially of:

i) magnesium trifluoromethanesulfonate;

ii) magnesium chloride; and iii) a solvent comprising 1,2-dimethoxyethane, wherein the magnesium ions and the halide ions are present in the electrolyte composition in a $[Mg^{2+}]:[Cl^-]$ ratio of from >1:1 to about 5:1.

Alternatively, in the above liquid electrolyte composition, the total concentration of the magnesium ions in the magnesium trifluoromethanesulfonate and magnesium chloride divided by the concentration of the chloride ions of the magnesium chloride is greater than 1.

In another aspect, there is provided an electrochemical cell comprising:

a) a positive electrode;

b) a magnesium negative electrode; and c) the electrolyte composition as defined herein;

wherein the positive electrode and the magnesium negative electrode are in fluid communication with the electrolyte.

Definitions

The term "stable", "stability" and grammatical variants thereof, in the context of this specification, refers to an electrode that can be operated with no sign of short circuiting and/or without experiencing sudden fluctuations in voltage or current or capacity.

The term "homogenous" as used herein refers to substances which comprise components or elements which are the same. The term also refers to mixtures which contain a uniform distribution of components throughout. Homogenous mixtures may have the same composition of components or elements throughout. As described herein, homogenous mixtures may contain only one phase of matter, e.g. only liquid, solid or gas; while homogenous electrodes may contain only a single element.

The term "optionally substituted" as used herein means the group to which this term refers may be unsubstituted, or may be substituted with one or more groups independently selected from alkyl, alkenyl, alkynyl, thioalkyl, cycloalkyl, cycloalkylalkyl, cycloalkenyl, cycloalkylalkenyl, heterocycloalkyl, cycloalkylheteroalkyl, cycloalkyloxy, cycloalkenyloxy, cycloamino, halo, carboxyl, oxo, haloalkyl, haloalkenyl, haloalkynyl, alkynyloxy, heteroalkyl, heteroalkyloxy, hydroxyl, hydroxyalkyl, alkoxy, thioalkoxy, alkenyloxy, haloalkoxy, haloalkenyloxy, nitro, amino, nitroalkyl, nitroalkenyl, nitroalkynyl, nitroheterocyclyl, alkylamino, dialkylamino, alkenylamine, aminoalkyl, alkynylamino, acyl, alkyloxy, alkyloxyalkyl, alkyloxyaryl, alkyloxycarbonyl, alkyloxycycloalkyl, alkyloxyheteroaryl, alkyloxyheterocycloalkyl, alkenoyl, alkynoyl, acylamino, diacylamino, acyloxy, alkylsulfonyloxy, heterocyclyl, heterocycloalkenyl, heterocycloalkyl, heterocycloalkylalkyl, heterocycloalkylalkenyl, heterocycloalkylheteroalkyl, heterocycloalkyloxy, heterocycloalkenyloxy, heterocycloxy, heterocycloamino, haloheterocycloalkyl, alkylsulfinyl, alkylsulfonyl, alkylsulfenyl, alkylcarbonyloxy, alkylthio, acylthio, aminosulfonyl, phosphorus-containing groups such as phosphono and phosphinyl, sulfinyl, sulfinylamino, sulfonyl, sulfonylamino, aryl, heteroaryl, heteroarylalkyl, heteroarylalkenyl, heteroarylheteroalkyl, heteroarylamino, heteroaryloxy, arylalkenyl, arylalkyl, alkylaryl, alkylheteroaryl, aryloxy, arylsulfonyl, cyano, cyanate, isocyanate, —C(O)NH(alkyl), and —C(O)N(alkyl)$_2$.

The term "inorganic halide salt" as used herein refers to a halide salt compound that does not contain carbon-hydrogen bonds.

The term "Coulombic efficiency" as used herein refers to the ratio of stripping capacity over plating capacity.

The term "areal capacity" as used herein refers to the capacity of an electrode per unit area.

This term may be expressed in terms of mAh/cm$^2$.

Unless specified otherwise, the terms "comprising" and "comprise", and grammatical variants thereof, are intended to represent "open" or "inclusive" language such that they include recited elements but also permit inclusion of additional, unrecited elements.

The terms "a" and "an" herein do not denote a limitation of quantity, but rather denote the presence of at least one of the referenced items.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DESCRIPTION

Exemplary, non-limiting embodiments of a liquid electrolyte composition will now be disclosed The present disclosure relates to a liquid electrolyte composition comprising:

i) a magnesium salt comprising a trifluoromethane sulfonate anion;

ii) an additive selected from an organic halide salt, an inorganic halide salt or a mixture thereof; and iii) a solvent comprising one or more ethers, wherein the organic halide salt comprises a halide anion and a cation selected from an optionally substituted quaternary ammonium or a three to nine membered N-heterocyclic cation, and the cation comprises at least one protonated nitrogen capable of dissociating the trifluoromethane sulfonate anion from the magnesium salt, and wherein the total concentration of cations of the inorganic halide salt and magnesium ions of the magnesium salt divided by the concentration of anions of the inorganic halide salt is greater than 1 in the electrolyte composition.

The additive may be an organic halide salt. Without being bound by theory, it was postulated that the interaction between the protonated nitrogen of the above cation of the halide salt and the $OTf^-$ anion facilitates the dissociation of $Mg(OTf)_2$ in the ether solvent. Moreover, the halide of the halide salt advantageously assisted in the formation of electroactive species.

The concentration of the magnesium salt may be from about 0.01 M to about 2.5 M, from about 0.05 M to about 2.5 M, from about 0.1 M to about 2.5 M, from about 0.5 M to about 2.5 M, from about 1.0 M to about 2.5 M, from about 1.5 M to about 2.5 M, from about 2.0 M to about 2.5 M, from about 0.01 M to about 2.0 M, from about 0.01 M to about 1.5 M, from about 0.01 M to about 1.0 M, from about 0.01 M to about 0.5 M, from about 0.01 M to about 0.1 M, or from about 0.01 M to about 0.05 M. The concentration of the magnesium salt may be about 2.5M.

Advantageously, the presence of the above-defined halide salt may be capable of promoting solubility of the magnesium salt at room temperature. In embodiments, the magnesium salt may be provided in molar concentrations of from 0.01 M to 2.5 M while the electrolyte composition remains a homogeneous liquid composition.

In embodiments, the magnesium salt may be present in the electrolyte composition in a concentration of not less than 0.5M, not less than 1 M, not less than 1.5 M, not less than 2 M.

The molar ratio of the magnesium salt to the organic halide salt may be from 10:1 to 1:10. Preferably, the molar ratio of the magnesium salt to the organic halide salt may be 1:0.3 to 1:1.2.

Advantageously, it was surprisingly found that providing the above molar ratios of Mg salt to organic halide salt may lead to improved stability. For instance, electrolyte compositions having the above defined molar ratios may be used for reversible plating of magnesium (Mg) in excess of 500 cycles without substantial change in Coulombic efficiency. In embodiments, the change in Coulombic efficiency across 500 cycles of plating/stripping was found to deviate less than 5% from a mean value.

The N-heterocyclic cation may be selected from the group consisting of: an optionally substituted three-membered heterocyclic structure, an optionally substituted four-membered heterocyclic structure, an optionally substituted five-membered heterocyclic structure, an optionally substituted six-membered heterocyclic structure, an optionally substituted seven-membered heterocyclic structure, an optionally substituted eight-membered heterocyclic structure, and an optionally substituted nine-membered heterocyclic structure. The N-heterocyclic cation may preferably be 1-Ethyl-3-methylimidazolium (EMIM).

The heterocyclic structure may comprise 1, 2, 3, 4, 5, 6, 7, 8, or 9 heteroatoms.

The heteroatoms may be independently selected from the group consisting of nitrogen, oxygen, and sulfur.

The heteroatoms may be the same or different. The heterocyclic structure may comprise a saturated or an unsaturated ring.

The heterocyclic structure may be selected from the group consisting of aziridinium, azetidinium, pyrrolidinium, pyrrolinium, pyrrolium, imidazolium, pyrazolium, triazolium, tetrazolium, thiazolium, oxazolium, piperidinium, pyridinium, piperazinium, pyridazinium, pyrimidonium, pyrazinium, triazinium, morpholinium, oxazinium, thiomorpholinium, azepinium, azocanium and azonanium.

The organic halide salt may be selected from the group consisting of fluoride, chloride, bromide and iodide.

The electrolyte composition may comprise a mixture of at least two or more of said organic halide salts, said organic halide salts being distinct from each other.

The organic halide salt may be 1-ethyl-3-methylimidazolium chloride.

In embodiments, the provision of 1-ethyl-3-methylimidazolium chloride as the organic halide salt may provide an electrolyte composition comprising the magnesium salt in a molar concentration of 0.5M or greater. The 1-ethyl-3-methylimidazolium chloride may be provided in concentrations of from about 0.01 M to 10 M, from about 0.01 M to 5 M, or from about 0.01 M to 2 M. The combination of 1-ethyl-3-methylimidazolium chloride (EMImCl) and magnesium trifluoromethane sulfonate ($Mg(OTf)_2$) in ether advantageously resulted in Coulombic efficiency of Mg plating/stripping of 99% and areal capacity of the Mg anode of 1 $mAh/cm^2$.

In one embodiment, the combination of magnesium trifluoromethane sulfonate and 1-ethyl-3-methylimidazolium chloride in the electrolyte composition at a molar ratio of 1:1.2 advantageously resulted in Coulombic efficiency of above 98% and reversible Mg plating/stripping for 400 cycles without substantial loss in efficiency.

The organic halide salt may comprise a quaternary ammonium cation, said cation comprising a structure of $N^+ R^1R^2R^3R^4$, wherein each of $R^1$, $R^2$, $R^3$, and $R^4$ may be the same or different and wherein each of $R^1$, $R^2$, $R^3$, and $R^4$ may be an optionally substituted alkyl group.

Each of $R^1$, $R^2$, $R^3$, and $R^4$ may be independently selected from an optionally substituted $C_1$-$C_{10}$ alkyl, or an optionally substituted $C_2$-$C_5$ alkyl, or an optionally substituted $C_2$-$C_6$ alkyl, or an optionally substituted $C_4$-$C_6$ alkyl. Each of $R^1$, $R^2$, $R^3$, and $R^4$ may be a halogenated alkyl group.

The halogenated alkyl group may be an alkyl fluoride, alkyl chloride, alkyl bromide or alkyl iodide compound.

Each of $R^1$, $R^2$, $R^3$, and $R^4$ may be independently selected from the group consisting of: methyl, ethyl, propyl, butyl, pentyl, hexyl, heptyl, octyl, nonyl or decyl. The $R^1$, $R^2$, $R^3$, and $R^4$ of the halide salt may be butyl.

The organic halide salt may be tetrabutylammonium chloride.

In embodiments, the provision of tetrabutylammonium chloride as the organic halide salt may provide an electrolyte composition comprising the magnesium salt in a molar concentration of 0.5 M or greater. The tetrabutylammonium chloride may be provided in concentrations of from about 0.01 M to 10 M, from about 0.01 M to 5 M, or from about 0.01 M to 2 M. The combination of tetrabutylammonium chloride (TBAC) with magnesium trifluoromethanesulfonate advantageously resulted in an average Coulombic efficiency of Mg plating/stripping of 97.5% over 500 cycles of Mg plating/stripping and areal capacity of up to 5 $mAh/cm^2$.

The concentration of the organic halide salt may be from about 0.01 M to about 10 M, from about 0.05 M to about 10 M, from about 0.1 M to about 10 M, from about 0.5 M to about 10 M, from about 1 M to about 10 M, from about 3 M to about 10 M, from about 5 M to about 10 M, from about 7 M to about 10 M, from about 0.01 M to about 7 M, from about 0.01 M to about 5 M, from about 0.01 M to about 3 M, from about 0.01 M to 2 M, from about 0.01 M to about 1 M, from about 0.01 M to about 0.5 M, from about 0.01 M to about 0.1 M, or from about 0.01 M to about 0.05 M.

The additive may an inorganic halide salt.

The total concentration of the cations of the inorganic halide salts and the magnesium ions of the magnesium salt divided by the concentration of the anions of the inorganic halide salt may be from greater than about 1 to about 5 in the electrolyte composition. The total concentration of the cations of the inorganic halide salts and the magnesium ions of the magnesium salt divided by the anions of the inorganic halide salt may be from about 1.25 to about 2.5 in the electrolyte composition.

The cations of the inorganic halide salts may be lithium ion, sodium ions, cesium ions, magnesium ions, barium ions, or aluminum ions. The cations of the inorganic halide salts may be magnesium ions. The inorganic halide salts may be magnesium fluoride, magnesium chloride, magnesium bromide, or magnesium iodide.

The inorganic halide salts may be a fluoride salt, a chloride salt, a bromide salt or an iodide salt. The chloride salt may be selected from the group consisting of lithium chloride (LiCl), sodium chloride (NaCl), cesium chloride (CsCl), magnesium chloride ($MgCl_2$), barium chloride ($BaCl_2$) and aluminum chloride ($AlCl_3$). The halide salt may be magnesium chloride ($MgCl_2$). Other combinations of halide salts based on the cations and halide anions mentioned herein are also part of this disclosure.

By having a $[Mg^{2+}]:[Cl^-]$ ratio of greater than 1, or a total concentration of the $Mg^{2+}$ divided by the concentration of the $Cl^-$ of greater than 1, the solubility of the magnesium trifluoromethane sulfonate in ether was unexpectedly improved, which resulted in superior Coulombic efficiency and areal capacity. For instance, when 0.4 M of $MgCl_2$ is combined with 0.6 M of magnesium trifluoromethanesulfonate in ether, a clear, homogenous solution is surprisingly obtained. The improvement in solubility advantageously leads to superior Coulombic efficiency and cycle life.

The concentration of the magnesium trifluoromethanesulfonate may be from about 0.01 M to about 1.5 M, from about 0.05 M to about 1.5 M, from about 0.1 M to about 1.5 M, from about 0.5 M to about 1.5 M, from about 1.0 M to about 1.5 M, from about 1.3 M to about 1.5 M, from about 0.01 M to about 1.3 M, from about 0.01 M to about 1.0 M, from about 0.01 M to about 0.5 M, from about 0.01 M to about 0.1 M, from about 0.01 M to about 0.05 M. The concentration of the magnesium trifluoromethanesulfonate may be about 1.5 M.

Advantageously, the presence of the above-defined halide salt may be capable of promoting solubility of the magnesium salt. In embodiments, the magnesium trifluoromethanesulfonate may be provided in molar concentrations of 0.01 M to 1.5 M while the electrolyte composition remains a homogeneous liquid composition.

The concentration of the one or more inorganic halide salt may be from about 0.01 M to about 10 M, from about 0.05 M to about 10 M, from about 0.1 M to about 10 M, from about 0.5 M to about 10 M, from about 1 M to about 10 M, from about 3 M to about 10 M, from about 5 M to about 10 M, from about 7 M to about 10 M, from about 0.01 M to about 7 M, from about 0.01 M to about 5 M, from about 0.01 M to about 3 M, from about 0.01 M to about 1 M, from about 0.01 M to about 0.5 M, from about 0.01 M to about 0.1 M, from about 0.01 M to about 0.05 M.

The concentration of the one or more inorganic halide salt may be about 0.2 M. The combination of magnesium trifluoromethanesulfonate and 0.2 M $MgCl_2$ may advantageously result in an average Coulombic efficiency of 99.4% over 1000 Mg plating/stripping cycles. Further advantageously, the combination may result in an areal capacity of 5 mAh/cm$^2$.

In embodiments, the magnesium trifluoromethanesulfonate may be present in molar concentrations of up to 1.5 M, when the magnesium chloride salt is present at a concentration of about 1 M, while the electrolyte composition remains a homogeneous liquid composition.

The magnesium ions and the halide ions may be present in the electrolyte composition in a $[Mg^{2+}]:[Cl^-]$ ratio of from about >1:1 to 5:1. The magnesium ions and the halide ions may be present in the electrolyte composition in a $[Mg^{2+}]:[Cl^-]$ ratio of 2.5:1 to 1.25:1. Alternatively, the magnesium ions and the halide ions may be present in the electrolyte composition such that the concentration of the $Mg^{2+}$ ions divided by the concentration of the halide ions (such as $Cl^-$) may be in the range of greater than about 1 to about 5. The magnesium ions and the halide ions may be present in the electrolyte composition such that the concentration of the $Mg^{2+}$ ions divided by the concentration of the halide ions (such as $Cl^-$) may be in the range of about 1.25 to about 2.5.

The present disclosure relates to a liquid electrolyte composition consisting essentially of:

i) a magnesium salt comprising a trifluoromethane sulfonate anion;

ii) an additive selected from an organic halide salt, an inorganic halide salt or a mixture thereof; and iii) a solvent comprising one or more ethers, wherein the organic halide salt comprises a halide anion and a cation selected from an optionally substituted quaternary ammonium or a three to nine membered N-heterocyclic cation, and the cation comprises at least one protonated nitrogen capable of dissociating the trifluoromethane sulfonate anion from the magnesium salt, and wherein the total concentration of cations of the inorganic halide salt and magnesium ions of the magnesium salt divided by the concentration of anions of the inorganic halide salt is greater than 1 in the electrolyte composition.

In such electrolyte composition, where the additive is the inorganic halide salt, the inorganic halide salt is a magnesium halide salt. The magnesium halide salt may be magnesium fluoride, magnesium chloride, magnesium bromide, or magnesium iodide. The magnesium salt comprising the trifluoromethane sulfonate anion and the magnesium halide salts are the only metallic salts present. Therefore, this electrolyte composition does not contain non-magnesium metallic salts.

The total concentration of the cations of the inorganic halide salts and the magnesium ions of the magnesium salt divided by the anions of the inorganic halide salt may be from greater than about 1 to about 5 in the electrolyte composition. The total concentration of the cations of the inorganic halide salts and the magnesium ions of the magnesium salt divided by the anions of the inorganic halide salt may be from about 1.25 to about 2.5 in the electrolyte composition. In such an electrolyte composition, the inorganic halide salt is the magnesium halide salt. Therefore, the total concentration refers to the total of the concentration of the magnesium ions in the magnesium halide salt and the concentration of the magnesium ions in the magnesium salt.

When the inorganic halide salt is magnesium chloride, by having a $[Mg^{2+}]:[Cl^-]$ ratio of greater than 1, or a total concentration of the $Mg^{2+}$ divided by the concentration of the $Cl^-$ of greater than 1, the solubility of the magnesium trifluoromethane sulfonate in ether was unexpectedly improved, which resulted in superior Coulombic efficiency and areal capacity. For instance, when 0.4 M of $MgCl_2$ is combined with 0.6 M of magnesium trifluoromethanesulfonate in ether, a clear, homogenous solution is surprisingly obtained. The improvement in solubility advantageously leads to superior Coulombic efficiency and cycle life.

The concentration of the magnesium trifluoromethanesulfonate may be from about 0.01 M to about 1.5 M, from about 0.05 M to about 1.5 M, from about 0.1 M to about 1.5 M, from about 0.5 M to about 1.5 M, from about 1.0 M to about 1.5 M, from about 1.3 M to about 1.5 M, from about 0.01 M to about 1.3 M, from about 0.01 M to about 1.0 M, from about 0.01 M to about 0.5 M, from about 0.01 M to about 0.1 M, from about 0.01 M to about 0.05 M. The concentration of the magnesium trifluoromethanesulfonate may be about 1.5M.

Advantageously, the presence of the above-defined halide salt may be capable of promoting solubility of the magnesium salt. In embodiments, the magnesium trifluoromethanesulfonate may be provided in molar concentrations of 0.01 M to 1.5 M while the electrolyte composition remains a homogeneous liquid composition.

The concentration of the one or more inorganic halide salt may be from about 0.01 M to about 10 M, from about 0.05 M to about 10 M, from about 0.1 M to about 10 M, from about 0.5 M to about 10 M, from about 1 M to about 10 M, from about 3 M to about 10 M, from about 5 M to about 10 M, from about 7 M to about 10 M, from about 0.01 M to about 7 M, from about 0.01 M to about 5 M, from about 0.01 M to about 3 M, from about 0.01 M to about 1 M, from about 0.01 M to about 0.5 M, from about 0.01 M to about 0.1 M, from about 0.01 M to about 0.05 M.

The concentration of the one or more inorganic halide salt may be about 0.2 M. The combination of magnesium trifluoromethanesulfonate and 0.2 M $MgCl_2$ may advantageously result in an average Coulombic efficiency of 99.4% over 1000 Mg plating/stripping cycles.

Further advantageously, the combination may result in an areal capacity of 5 mAh/cm$^2$.

In embodiments, the magnesium trifluoromethanesulfonate may be present in molar concentrations of up to 1.5 M, when the magnesium chloride salt is present at a concentration of about 1 M, while the electrolyte composition remains a homogeneous liquid composition.

The magnesium ions and the halide ions may be present in the electrolyte composition in a $[Mg^{2+}]:[Cl^-]$ ratio of from about >1:1 to 5:1. The magnesium ions and the halide ions may be present in the electrolyte composition in a $[Mg^{2+}]:[Cl^-]$ ratio of 2.5:1 to 1.25:1.

The present disclosure relates to a liquid electrolyte composition consisting essentially of:

i) a magnesium trifluoromethanesulfonate;

ii) 1-ethyl-3-methylimidazolium chloride, tetrabutylammonium chloride, or a mixture thereof; and iii) a solvent comprising 1,2-dimethoxyethane.

The concentration of the magnesium trifluoromethanesulfonate salt may be about 2.5 M.

Advantageously, the presence of 1-ethyl-3-methylimidazolium chloride, tetrabutylammonium chloride, or a mixture thereof may be capable of promoting solubility of magnesium trifluoromethanesulfonate. Magnesium trifluoromethanesulfonate may be present at molar concentrations of up to 2.5 M, while the electrolyte composition remains a homogeneous liquid composition.

The present disclosure relates to a liquid electrolyte composition consisting essentially of:

i) magnesium trifluoromethanesulfonate;

ii) magnesium chloride; and iii) a solvent comprising 1,2-dimethoxyethane, wherein the magnesium ions and the halide ions are present in the electrolyte composition in a $[Mg^{2+}]:[Cl^-]$ ratio of from >1:1 to about 5:1.

Alternatively, in the above liquid electrolyte composition, the total concentration of the magnesium ions in the magnesium trifluoromethanesulfonate and magnesium chloride divided by the concentration of the chloride ions of the magnesium chloride is greater than 1.

The concentration of the magnesium trifluoromethanesulfonate salt may be about 1.5 M.

Advantageously, the presence of magnesium chloride may be capable of promoting solubility of magnesium trifluoromethanesulfonate. Magnesium trifluoromethanesulfonate may be present at molar concentrations of up to 1.5 M, while the electrolyte composition remains a homogeneous liquid composition.

The solvent may not comprise water.

The present disclosure relates to an electrochemical cell comprising:

a) a positive electrode;

b) a magnesium negative electrode; and c) the electrolyte composition as defined herein;

wherein the positive electrode and the magnesium negative electrode are in fluid communication with the electrolyte.

EXAMPLES

Non-limiting examples of the invention will be further described in greater detail by reference to specific Examples, which should not be construed as in any way limiting the scope of the invention.

Figure 1A:
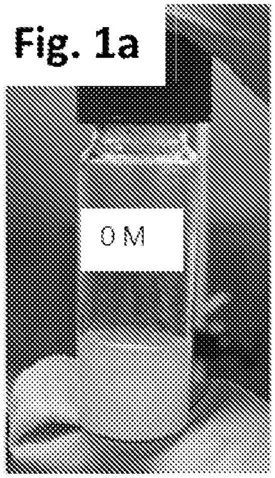
FIG. 1*a* and FIG. 1*b* are photo images of electrolyte solutions consisting of (a) 0.5 M $Mg(OTf)_2$ and (b) 0.5 M $Mg(OTf)_2$+0.15 M, 0.3 M, 0.6 M and 1.0 M of EMImCl in monoglyme.
Figure 1B:
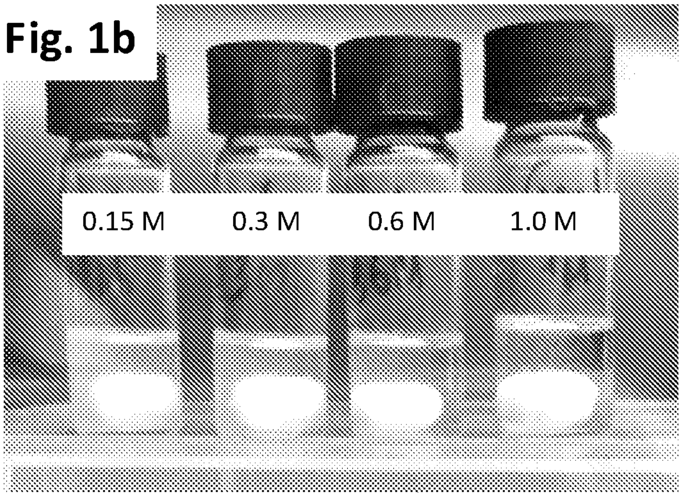
Figure 4A:
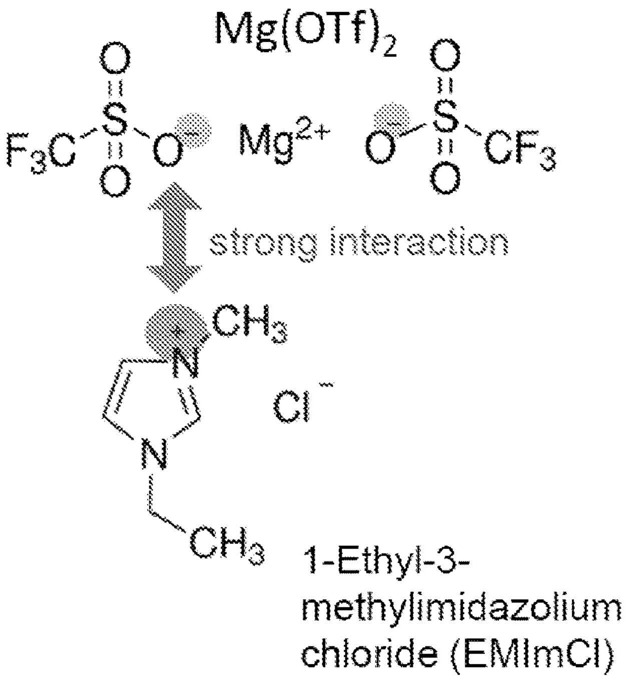
FIG. 4*a* is an illustration of the strong interaction between $Mg(OTf)_2$ and EMImCl, which may result in the increased solubility of $Mg(OTf)_2$ in ether solvents.

Example 1. Solubility of the Electrolytes $Mg(OTf)_2$ and EMImCl in Ether Solvent Experimental results confirmed the prediction on the positive effect of 1-Ethyl-3-methylimidazolium chloride (EMImCl) additive to the performance of magnesium trifluoromethanesulfonate ($Mg(OTf)_2$)-based electrolyte. In this invention, several electrolyte compositions with formula presented by x M $Mg(OTf)_2$+y M EMImCl in monoglyme (x=0.25, 0.5, 0.75, 1; y=0.15, 0.3, 0.6, 1.0) are presented. As shown in FIGS. 1*a* and 1*b*, by adding 0.15 M, 0.3 M, 0.6 M and 1.0 M of EMImCl into 0.5 M $Mg(OTf)_2$ in monoglyme, the solution turned from turbid to clear indicating the solubility of $Mg(OTf)_2$ was increased. The increased solubility could be attributed to the strong interaction between the anion of $Mg(OTf)_2$ and the cation of EMImCl as shown in FIG. 4*a*.

It should be noted here that the electrolyte solutions consisting of $Mg(OTf)_2$ and EMImCl in other ethers and their mixtures are also obtainable by controlling $Mg(OTf)_2$:EMImCl molar ratio. In addition, the combination of EMImCl with other magnesium salts, including $Mg(TFSI)_2$ and magnesium perchlorate ($Mg(ClO4)_2$), was examined. These electrolytes, however, demonstrate poor electrochemical performance. It is probably due to instability of $TFSI^-$ and $ClO^{4-}$ anions against reduction at Mg metal surface.

$Mg(OTf)_2$ and TBAC in Ether Solvent

Figure 2A:
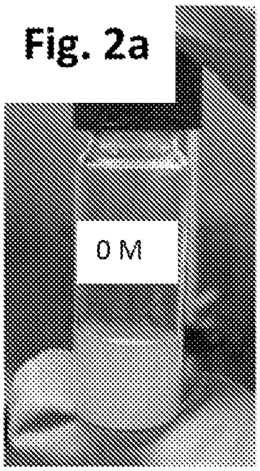
FIG. 2*a* and FIG. 2*b* are photo images of electrolyte solutions consists of (a) 0.5 M $Mg(OTf)_2$ and (b) 0.5 M $Mg(OTf)_2$+0.3 M TBAC in monoglyme.
Figure 2B:
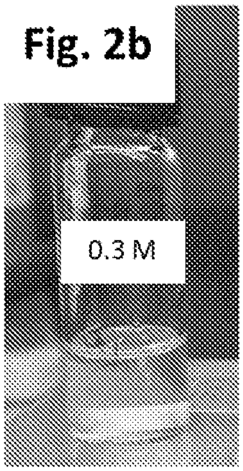
Figure 4B:
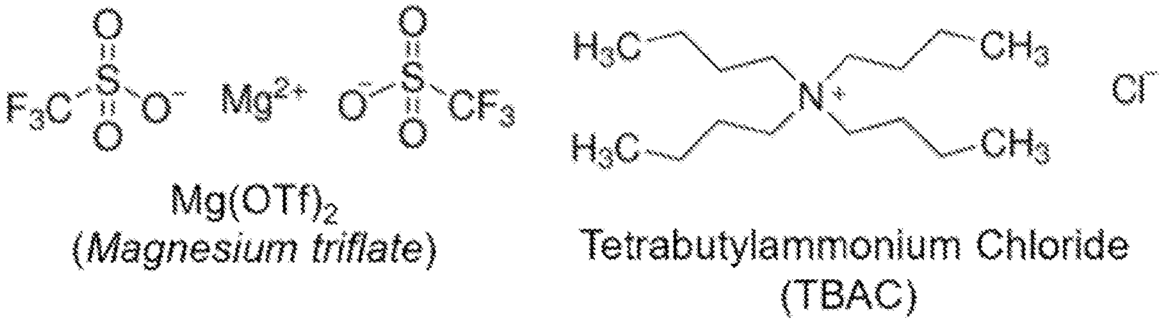
FIG. 4*b* is an illustration of the strong interaction between $Mg(OTf)_2$ and TBAC, which may result in the increased solubility of $Mg(OTf)_2$ in ether solvents.

The solubility of $Mg(OTf)_2$ was also increased by adding 0.3M (tetrabutylammonium chloride) TBAC into 0.5M $Mg(OTf)_2$ in monoglyme (dimethoxyethane, DME), as shown in FIG. 2*a* and FIG. 2*b*. In particular, TBAC assists in the dissolution of $Mg(OTf)_2$ in ether solution and acts as a source of $Cl^-$ for the formation of electroactive species (e.g. $[Mg_2(\mu\text{-}Cl)_2(DME)_4]^{2+}$). The increased solubility could be attributed to the strong interaction between the anion of $Mg(OTf)_2$ and the cation of TBAC as shown in FIG. 4*b*.

$Mg(OTf)_2$ and $MgCl_2$ in Ether Solvent

It was also found that the inorganic chloride ($MgCl_2$) also helps to improve the solubility of $Mg(OTf)_2$ in ether solvent, by carefully controlling the molar ratio between $Mg^{2+}$ and $Cl^-$ in ether solvent. FIG. 3 and Table 1 demonstrates the crucial effect of $[Mg^{2+}]:[Cl^-]$ molar ratio in the formation of a clear electrolyte solution. It should be noted here that both $Mg(OTf)_2$ and $MgCl_2$ have a very low solubility in ether solvent. However, the reaction between $Mg(OTf)_2$ and $MgCl_2$ in ether solvent helps in improving their solubility. Therefore, the ratio between $Mg(OTf)_2$ and $MgCl_2$ plays an important role in the formation of a clear and stable electrolyte solution. It may be possible that $Mg(OTf)_2$ reacts with $MgCl_2$ and forms various species such as $Mg[OTf]_x[Cl]_y[solvent]_z$(with 0≤x, y, z≤3), which are easier to be dissolved into electrolyte solution.

Figure 3A:
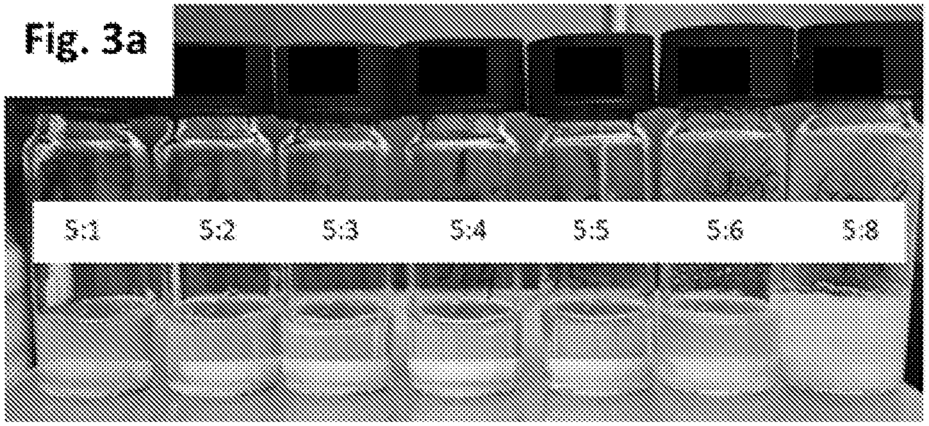
FIG. 3*a* and FIG. 3*b* are photo images of electrolyte solutions consisting of (a) $Mg(OTf)_2$-$MgCl_2$ electrolyte solution at various [Mg2+]:[Cl—] molar ratios after stirring at 60° C. for 24 hours and (b) 1.5 M $Mg(OTf)_2$ with $MgCl_2$.
Figure 3B:
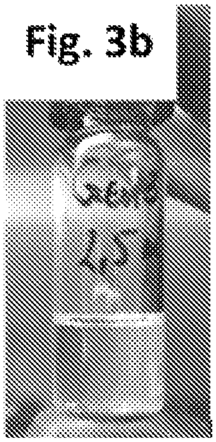

In particular, electrolytes with $[Mg^{2+}]:[Cl^-]$ ratio greater than 1 were found to be clear and stable. FIG. 3*a* shows that clear electrolyte solutions are obtained by controlling $[Mg^{2+}]$: $[Cl^-]$ between 5:2 to 5:4. On the other hand, the electrolyte solution with $[Mg^{2+}]:[Cl^-]$ ratio of 5:5 is unstable as salt crystals form at room temperature. As for electrolytes with $[Mg^{2+}]:[Cl^-]$ ratio of 5:6 and 5:8, the salts were found to be incompletely dissolved, forming unclear solutions. FIG. 3*b* shows that with addition of 1 M $MgCl_2$, the concentration of $Mg(OTf)_2$ can reach as high as 1.5 M in dimethoxyethane (DME) and solution still remained clear. Total concentration of $[Mg^{2+}]$ is 2.5 M (1.5 M from $Mg(OTf)_2$+1 M from $MgCl_2$). The concentration of $[Cl^-]$ is 2 M. Therefore, [Mg2+]: $[Cl^-]$ is 2.5:2, which equals 1.25 and is greater than 1. Therefore, it can be seen that for electrolytes where the concentration of the cations of the inorganic halide salt and magnesium ions of the magnesium salt (which in this case is the total concentration of the $Mg^{2+}$ ions in the $Mg(OTf)_2$ and the $MgCl_2$) divided by the concentration of anions of the inorganic halide salt (which in this case is $Cl^-$) is greater than 1 in the electrolyte composition, the electrolyte composition was a clear solution, showing that the solubility of $Mg(OTf)_2$ was increased.

TABLE 1

Combinations of $Mg(OTf)_2$ and $MgCl_2$ in monoglyme as electrolyte solution for Mgion batteries

| Electrolyte formula | $[Mg^{2+}]:[Cl^-]$ | Result |
|---|---|---|
| 0.45M $Mg(OTf)_2$ + 0.05M $MgCl_2$/monoglyme | 5:1 | Unclear solution |
| 0.4M $Mg(OTf)_2$ + 0.1M $MgCl_2$/monoglyme | 5:2 | Clear solution |
| 0.35M $Mg(OTf)_2$ + 0.15M $MgCl_2$/monoglyme | 5:3 | Clear solution |

TABLE 1-continued

Combinations of $Mg(OTf)_2$ and $MgCl_2$ in monoglyme as electrolyte solution for Mgion batteries

| Electrolyte formula | $[Mg^{2+}]:[Cl^-]$ | Result |
|---|---|---|
| 0.3M $Mg(OTf)_2$ + 0.2M $MgCl_2$/monoglyme | 5:4 | Clear solution |
| 0.6M $Mg(OTf)_2$ + 0.4M $MgCl_2$/monoglyme | 5:4 | Clear solution |
| 0.25M $Mg(OTf)_2$ + 0.25M $MgCl_2$/monoglyme | 5:5 | Clear solution (unstable) |
| 0.25M $Mg(OTf)_2$ + 0.3M $MgCl_2$/monoglyme | 5:6 | Unclear solution |
| 0.1M $Mg(OTf)_2$ + 0.4M $MgCl_2$/monoglyme | 5:8 | Partly dissolved |

Example 2. Fabrication of an Electrochemical Cell

Figure 5:
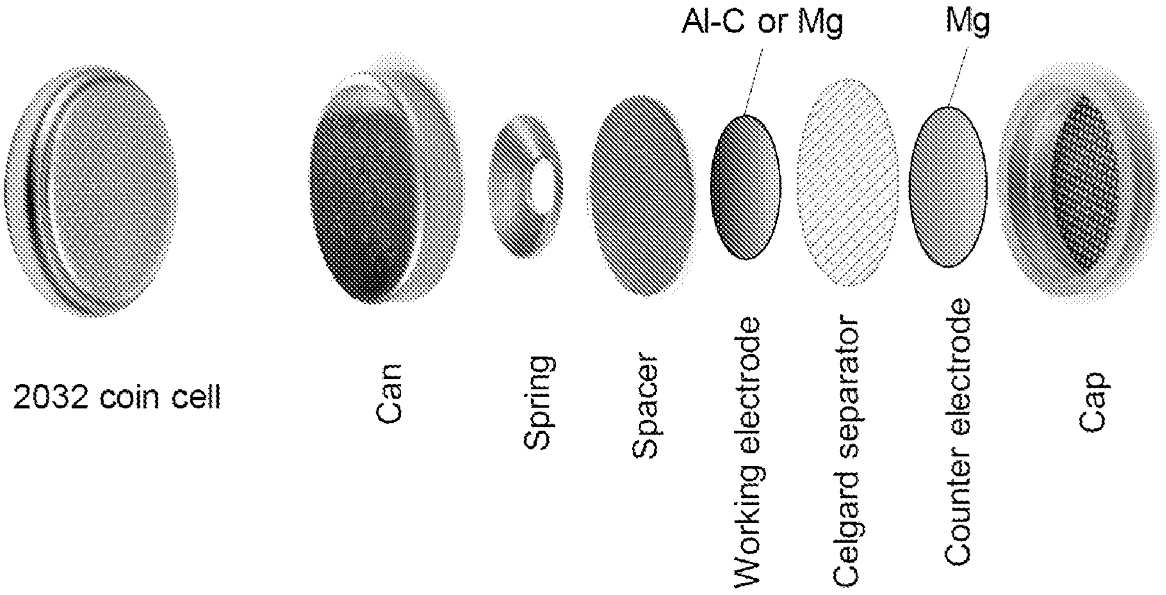
FIG. 5 is a representation of an exemplary 2032 coin cell which may be assembled. The asymmetric cell utilizes a carbon coated aluminium foil as the working electrode and a magnesium disk as a counter electrode.

The electrochemical performance of the electrolyte described herein was evaluated by fabricating a 2032 coin cell comprising the electrolyte, as illustrated in FIG. 5. Unless described otherwise, the coin-cell configuration described below was adopted for the electrochemical studies of the electrolytes described herein.

In asymmetric (Al—C//Mg) cell test, the coin-cell consists of a polished Mg disk (1.27 $cm^2$) as a counter electrode, 2 layers of Celgard separator, Al—C disk (carbon coated Aluminum foil) (1 $cm^2$) as a working electrode, and 25 μl of $Mg(OTf)_2$ electrolyte. In symmetric (Mg//Mg) cell tests, the Al—C disk was replaced by an Mg disk (1.27 $cm^2$).

The asymmetric cell was galvanostatically cycled with a current density of 0.5 $mA/cm^2$. First, an areal capacity of 0.1 $tnAh/cm^2$ of Mg was plated onto Al—C working electrode, Mg was then stripped until the voltage reaches 1.2 V. The Coulombic efficiency (CE) was defined as the ratio of stripping capacity to plating capacity.

Figure 6:
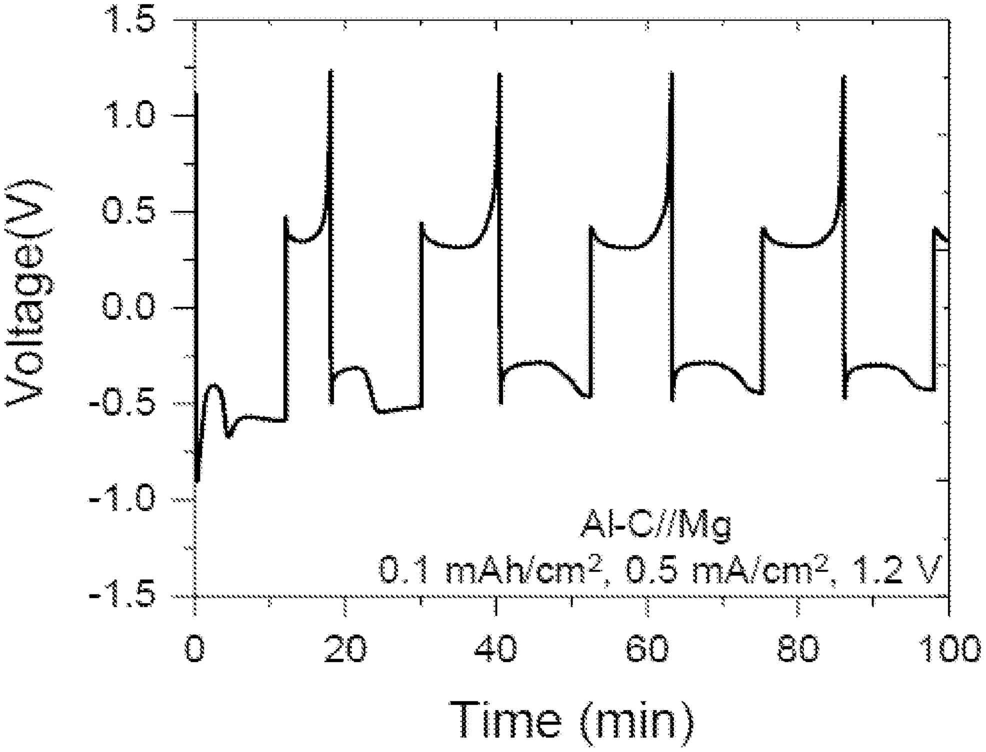
FIG. 6 is a diagram showing the cell voltage measured during the galvanostatic plating/stripping for $Mg(OTf)_2$-EMImCl electrolyte solution.
Figure 7A:
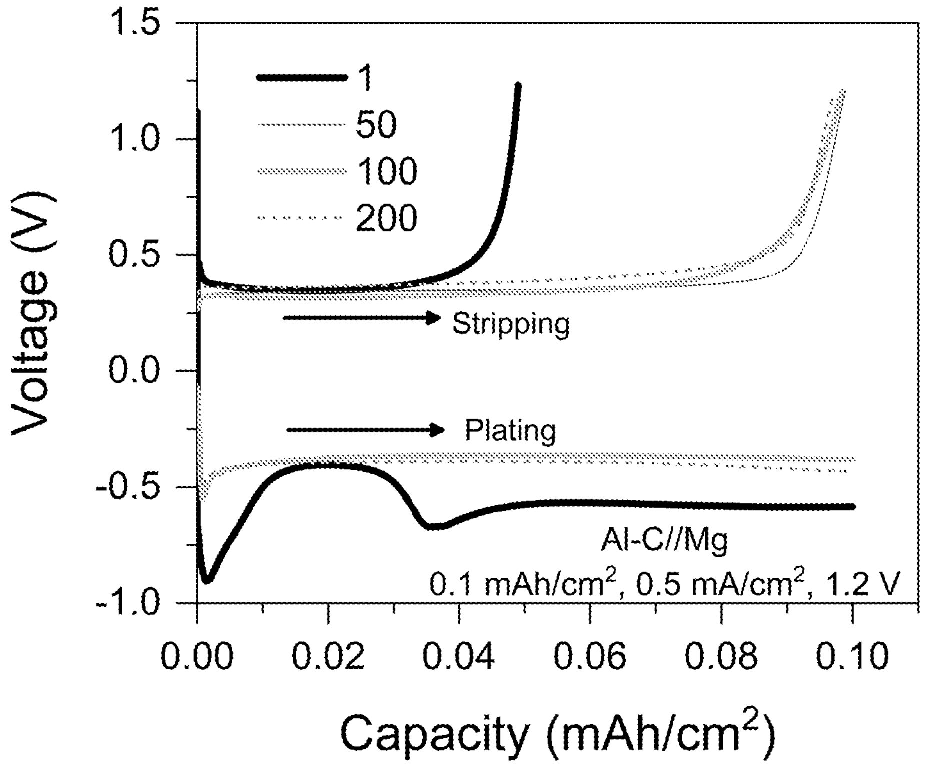
FIG. 7*a* is a voltage profile of 0.5 M $Mg(OTf)_2$+0.3 M EMImCl in monoglyme electrolyte. The legend indicates the cycle number of each plot.
Figure 8A:
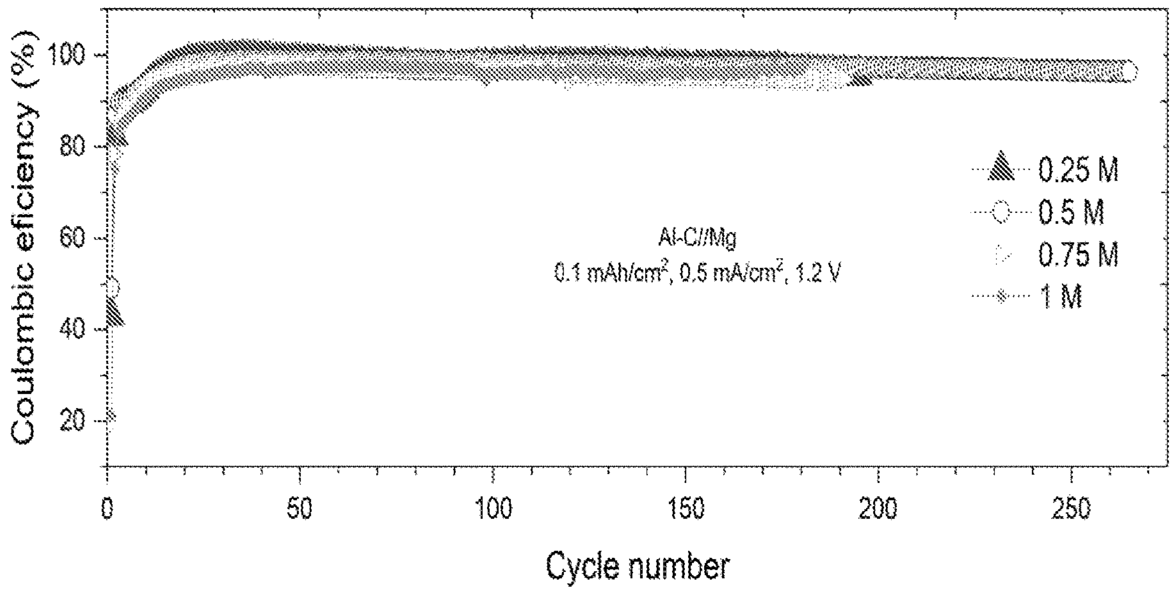
FIG. 8*a* is a plot showing plating/stripping Coulombic efficiency of Mg anode in electrolytes containing 0.3 M EMImCl with Mg(OTf)2 salt concentration varied from 0.25 M to 1 M.

Example 3. Electrochemical Properties Tested with Al—C Electrodes $Mg(OTf)_2$ and EMImCl in Ether Solvent The reversible Mg plating/stripping was successfully demonstrated in 0.5 M $Mg(OTf)_2$+0.3 MEMImCl in monoglyme (FIG. 6). The reversible plating and stripping of Mg on Al—C foil were observed near −0.35 V and 0.35 V vs. $Mg/Mg^{2+}$ (FIG. 7*a*) respectively. FIG. 8*a* and Table 2 present the electrochemical performance of the electrolyte with the concentration of $Mg(OTf)_2$ varied from 0.25 M to 1 M, and 0.3 M EMImCl.

TABLE 2

Coulombic efficiency and cycle life of Al—C//Mg cells with different concentration of $Mg(OTf)_2$ salt. The concentration of EMImCl is 0.3M in these electrolyte solution.

| Salt concentration (M) | Initial CE (%) | Highest CE (%) | Cycle life |
|---|---|---|---|
| 0.25 | 43.1 | 99.2 | 196 |
| 0.5 | 49.0 | 99.0 | 265 |
| 0.75 | 19.3 | 98.1 | 191 |
| 1 | 21.3 | 98.2 | 181 |

In the first cycle, Coulombic efficiency of the cell was relatively low (49%), which is due to the irreversible reduction of electrolyte components and/or contaminants (e.g. moisture). With increased cycle number, Coulombic efficiency of the cell increased significantly and reached 99% in subsequent cycles.

Among these electrolyte compositions, the cell using 0.5 M $Mg(OTf)_2$+0.3 M EMImCl in monoglyme electrolyte showed best performance. This cell delivered the highest initial Coulombic efficiency (ICE) (49%) and highest Coulombic efficiency was recorded at 99% in subsequent cycles. The longest cycle life of 260 cycles was also achieved at this composition. At higher concentration of $Mg(OTf)_2$ (above 0.5 M), the cells showed lower Coulombic efficiency, which was probably due to high viscosity of electrolyte solution and increased concentration of contaminants. Therefore, the optimum concentration of $Mg(OTf)_2$ is 0.5 M.

Figure 9A:
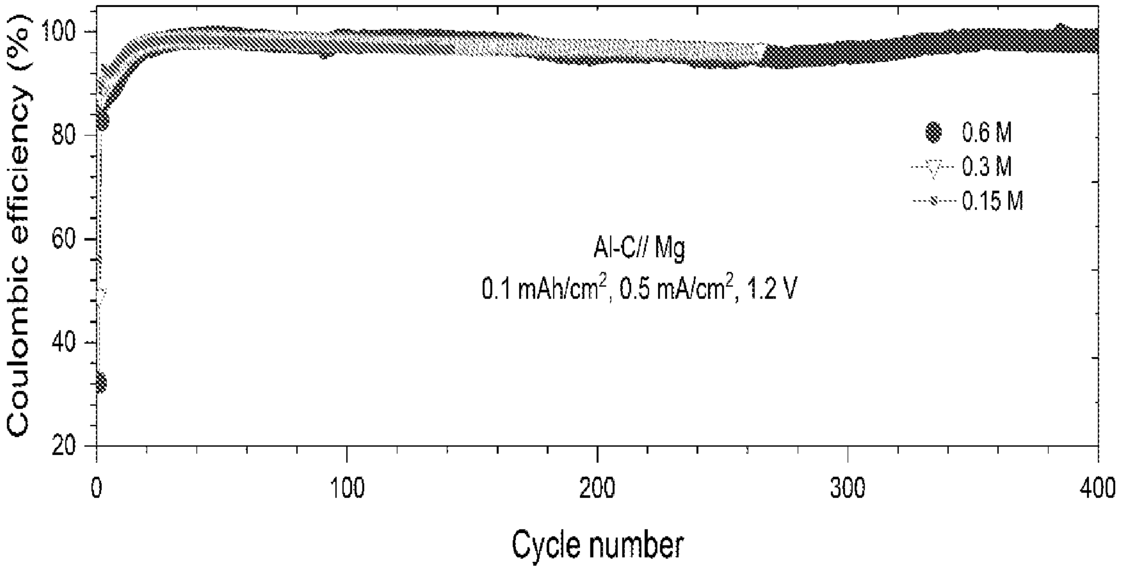
FIG. 9*a* is a plot showing plating/stripping Coulombic efficiency of Mg anode using the electrolytes containing 0.5 M $Mg(OTf)_2$ salt with EMImCl concentrations varied from 0.15 M to 0.6 M.
Figure 9B:
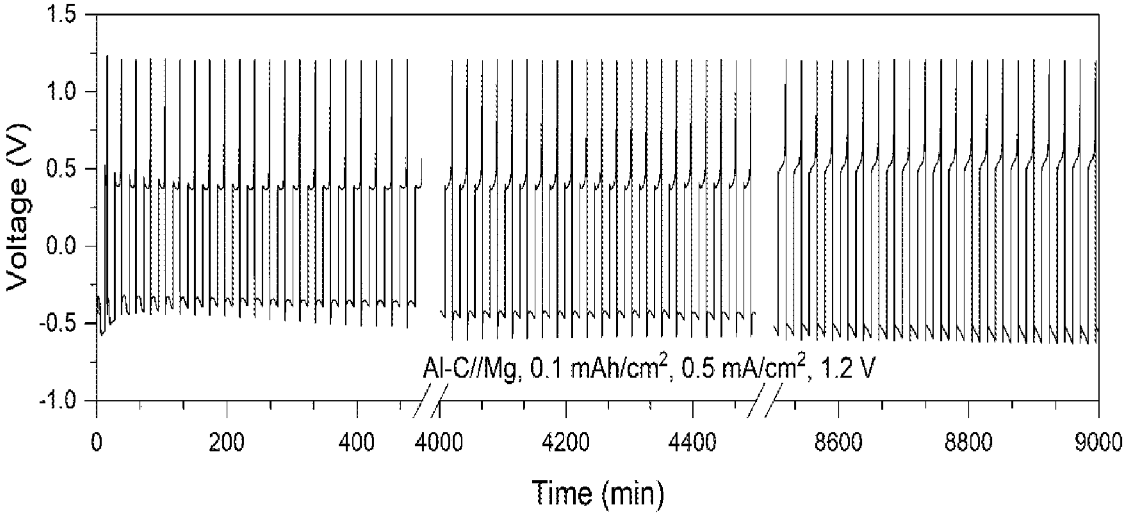
FIG. 9*b* is a plot showing cell voltage measured during the galvanostatic plating/stripping of Al—C//Mg cell using 0.5 M Mg(OTf)2+0.6 M EMImCl in monoglyme for 400 cycles.

FIG. 9*a* and Table 3 present the electrochemical performance of the electrolytes consisting of 0.5 M $Mg(OTf)_2$ and EMImCl additive at 0.15 M, 0.3 M, and 0.6 M. The highest initial Coulombic efficiency of 56% was achieved at 0.15 M of EMImCl. Initial Coulombic efficiency of cells decreased at higher EMImCl concentrations. During cycling, three electrolyte compositions demonstrated high Coulombic efficiency above 98%. However, longer cycle life was achievable at the higher concentrations of additive. The cell using 0.5 M $Mg(OTf)_2$+0.6 M EMImCl in monoglyme showed longest cycle life (400 cycles) with Coulombic efficiency above 98%.

TABLE 3

Coulombic efficiency and cycle life of Al—C//Mg cells with different concentration of EMImCl additive

| EMImCl concentration (M) | Initial CE (%) | Highest CE (%) | Cycle life |
|---|---|---|---|
| 0.15 | 56.0 | 98.5 | 142 |
| 0.3 | 49.0 | 99.0 | 265 |
| 0.6 | 32.2 | 99.6 | 401 |

Herein, 0.5 M $Mg(OTf)_2$+0.6 M EMImCl in monoglyme was considered as the optimum composition for Mg plating/stripping. At this composition, the Mg plating/stripping cycles were highly reversible up to 400 cycles with a slightly increasing overpotential, from ±0.35 V in early cycles to ±0.6 V at the 400th cycle. In addition, a high ionic conductivity of 5.1 mS/cm was recorded at this electrolyte composition.

Figure 10A:
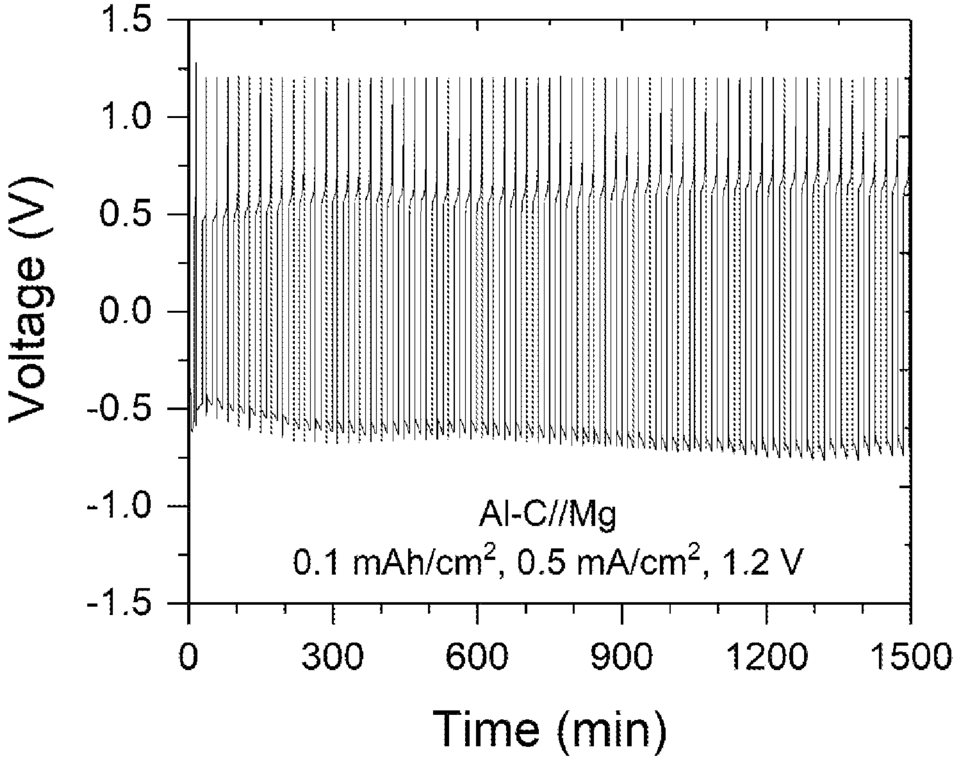
FIGS. 10*a* and 10*b* are plots showing cell voltage measured (a) and Coulombic efficiency (b) during the galvanostatic plating/stripping of Al—C//Mg cell using 0.5 M $Mg(OTf)_2$+0.6 M EMImCl in triglyme.
Figure 10B:
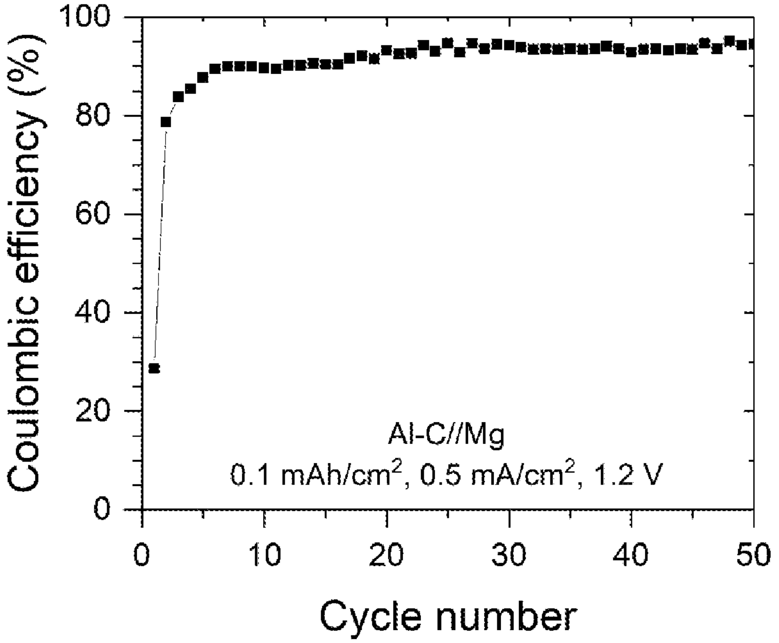

The choice of ether solvents for this electrolyte system is not limited to monoglyme. As a representative example, reversible plating/stripping of Mg in an electrolyte consisting of 0.5 M $Mg(OTf)_2$+0.6 M EMImCl in triglyme (FIG. 10) was also tested. The Mg//Al—C cell delivered an initial Coulombic efficiency of 29% and a Coulombic efficiency of 95% at 50th cycle. The Coulombic efficiency was lower than that of the cell using monoglyme solvent. This is probably due to higher viscosity and higher concentration of contaminants in triglyme compared to monoglyme. From a practical point of view, the use of higher glyme solvents (diglyme, triglyme, and tetraglyme) is preferable due to lower flammability (higher boiling point).

High Areal Capacity of Mg Anode

Figure 11A:
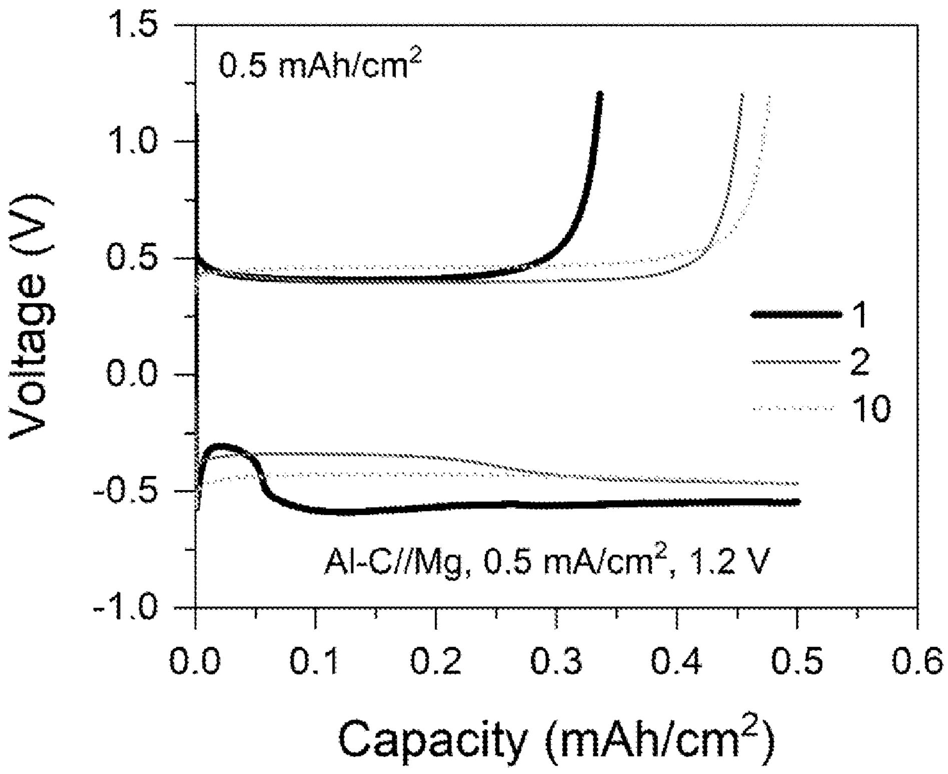
FIG. 11*a* and FIG. 11*b* are voltage profiles of Al—Cl//Mg using 0.5 M $Mg(OTf)_2$+0.6 M EMImCl in monoglyme electrolyte at high areal capacity of (a) 0.5 $mAh/cm^2$ and (b) 1 $mAh/cm^2$. The legend indicates the cycle number of each plot.
Figure 11B:
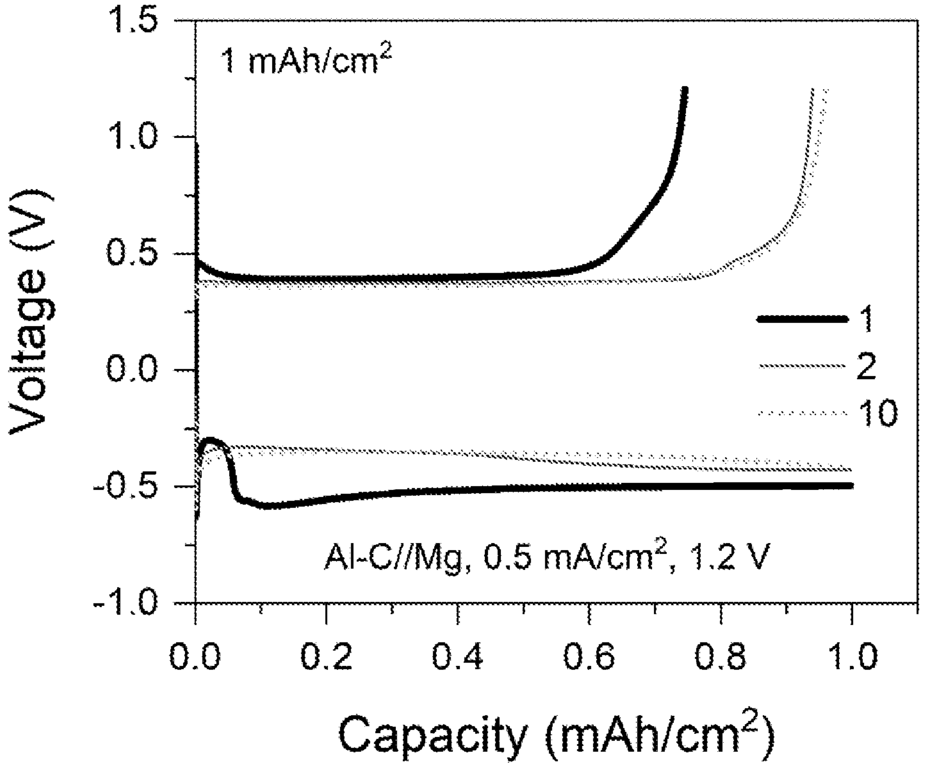
Figure 11C:
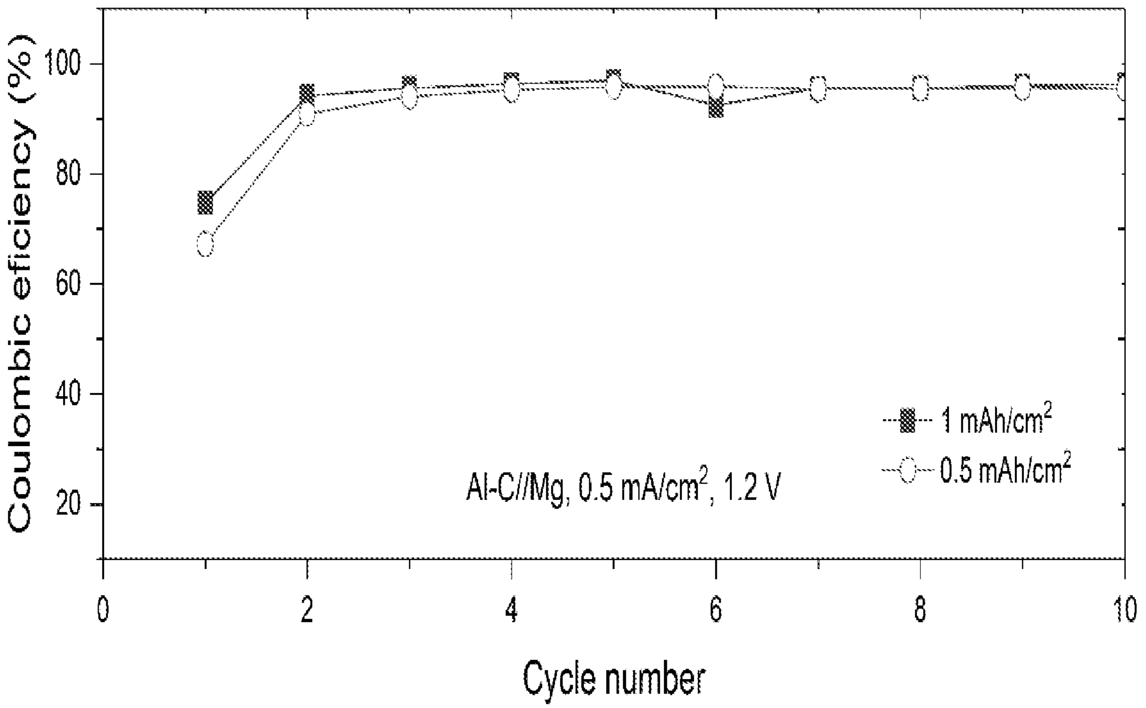
FIG. 11*c* is a plot showing plating/stripping Coulombic efficiency of Al—C//Mg at high areal capacities of 0.5 $mAh/cm^2$ and 1 $mAh/cm^2$. The legend indicates the cycle number of each plot.

Towards practical application of Mg metal anode, the Al—C//Mg cells were cycled at high areal capacity of 0.5 $mAh/cm^2$ and 1 $mAh/cm^2$ (FIG. 11), which is close to practical battery requirements. From FIG. 11, the reversible plating/stripping of Mg at these high areal capacities was successfully achieved with 0.5 M $Mg(OTf)_2$+0.6 M EMImCl in monoglyme electrolyte. In these cases, the plating and stripping overpotential slightly increased to −0.4 V and 0.4 V, respectively. Interestingly, the cells showed high initial Coulombic efficiency of 67.2% and 74.7% at the areal capacities of 0.5 mAh/$cm^2$ and 1 mAh/$cm^2$, respectively. Coulombic efficiency above 95% was achieved for both cells during cycling at high areal capacities.

$Mg(OTf)_2$ and TBAC in Ether Solvent

Several electrolyte compositions with formula represented by x M $Mg(OTf)_2$+y M TBAC in monoglyme (x=0.5; y=0.15, 0.3, 0.6, 1) were examined. The experiments were conducted to evaluate the key technical performance of high-performance electrolyte systems, including Mg plating/stripping Coulombic efficiency and cycle life under different cycling conditions. The electrolyte combination consisting of 0.5 M $Mg(OTf)_2$ and 0.3 M TBAC in monoglyme shows excellent electrochemical performance in a half-cell test. Table 4 summarizes the key technical features of the designed electrolyte formula.

TABLE 4

The key technical features of 0.5M $Mg(OTf)_2$ + 0.3M TBAC in monoglyme electrolyte.

| Key Features | Performance | Remarks |
|---|---|---|
| Mg plating/stripping CE | 97.5% (0.5 mA/$cm^2$ and 0.1 mAh/$cm^2$, 500 cycles) | Very high Coulombic efficiency; Max CE: 98.2% |
| Current density | 0.25-4 mA/$cm^2$ | Deliver high power density |
| Areal capacity | 0.1-5 mAh/$cm^2$ | Deliver high energy density |
| | 500 cycles (0.1 mAh/$cm^2$) | Long cycle life |
| Cycle | 290 cycles (0.5 mAh/$cm^2$) | Long cycle life |
| life | 133 cycles (1 mAh/$cm^2$) | |
| Ionic conductivity | 2 mS/cm | At room temperature |
| | Maximum of 2.6 mS/cm | 0.5M $Mg(OTf)_2$ + 1M TBAC/monoglyme |
| Plating potential | −0.15 V vs. Mg/$Mg^{2+}$ | Low overpotential |
| Stripping potential | 0.17 vs. Mg/$Mg^{2+}$ | Low overpotential |
| Anodic stability | 4.0 V vs. Mg/$Mg^{2+}$ on Pt electrode | High anodic stability |
| Morphology of Mg deposition | Homogeneous, dendrite-free (FIG. 16) | Safe operation |

Figure 7B:
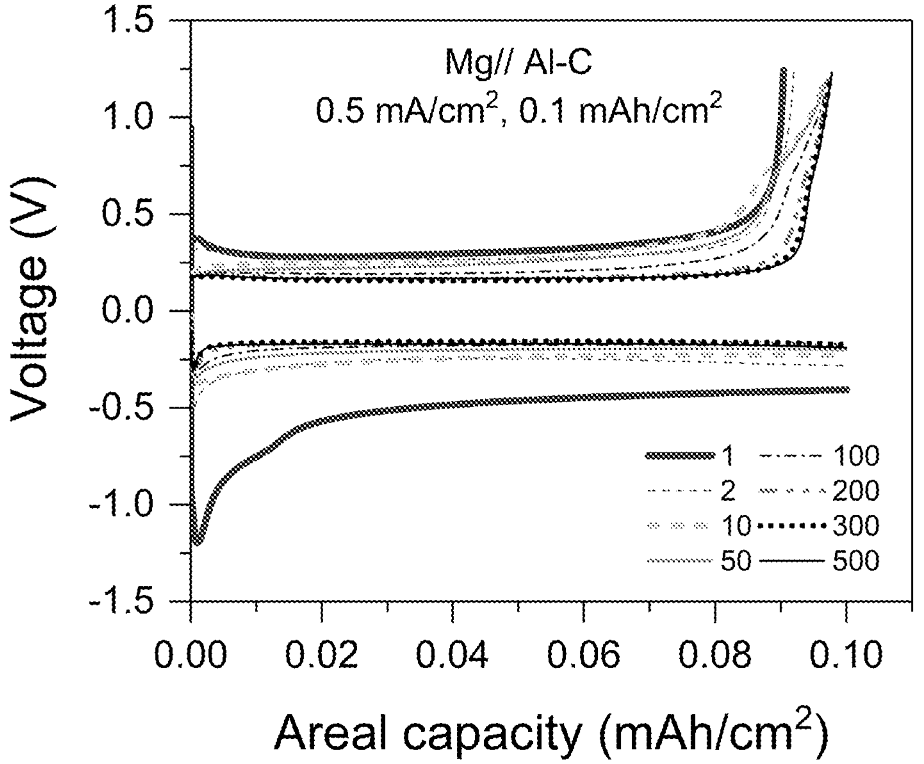
FIG. 7*b* is a voltage profile of Mg//Al—C cell using 0.3 M $Mg(OTf)_2$+0.3 M TBAC in monoglyme electrolyte. The legend indicates the cycle number of each plot.
Figure 7C:
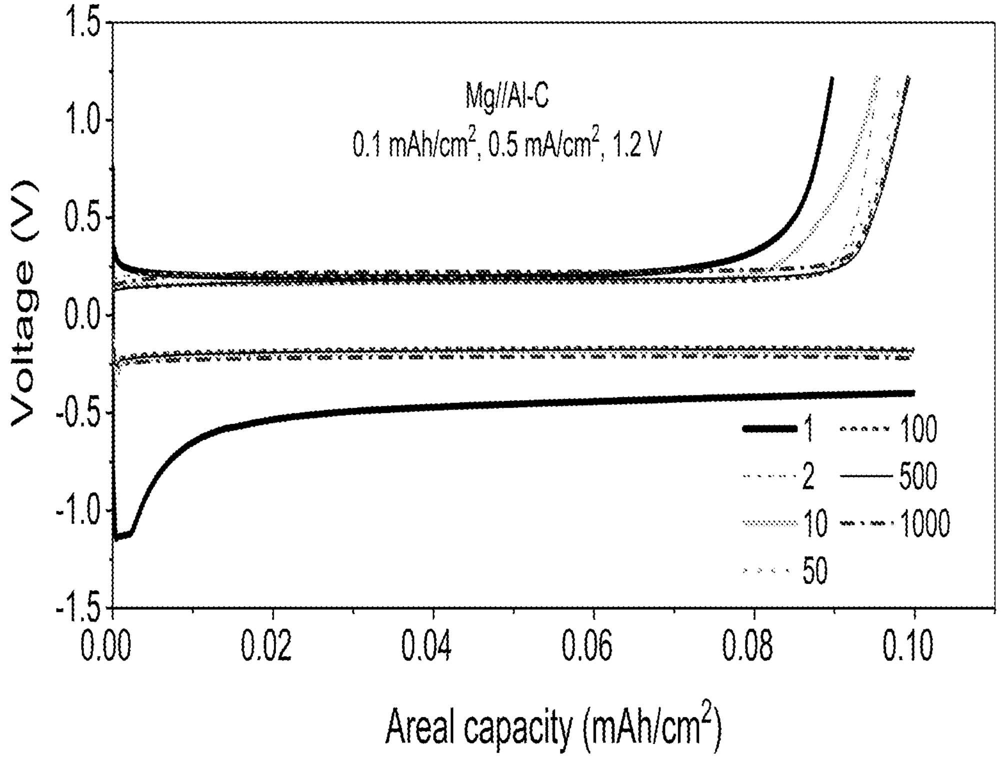
FIG. 7*c* is a voltage profile of Mg//Al—C cell using 0.3 M Mg(OTf)2+0.2 M MgCl2 in monoglyme electrolyte. The legend indicates the cycle number of each plot.
Figure 8B:
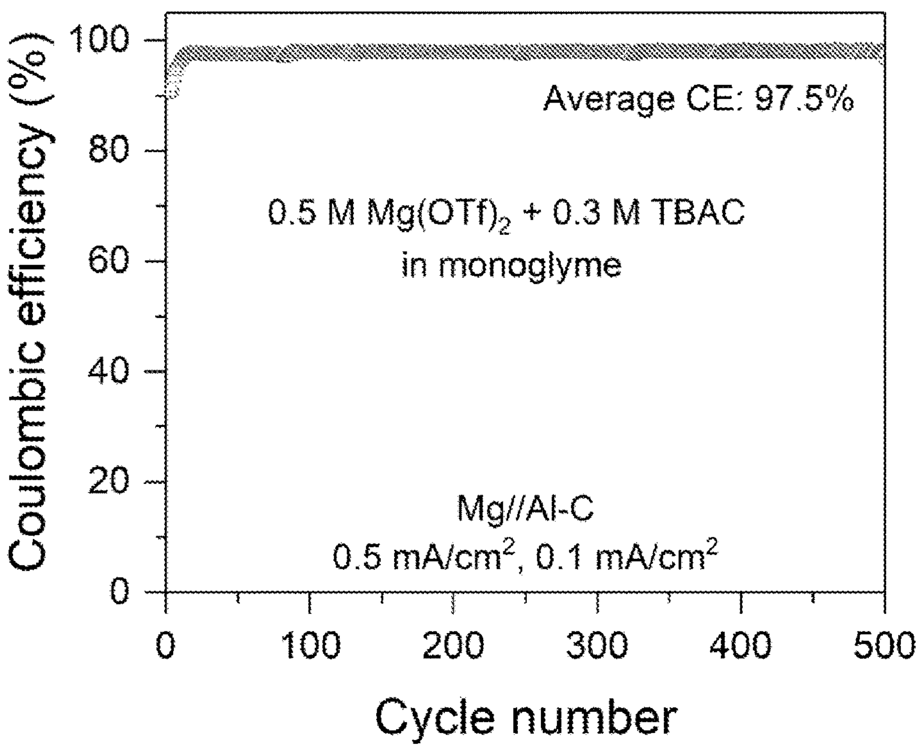
FIG. 8*b* is a plot showing Coulombic efficiency of Mg//Al—C cell using 0.3 M $Mg(OTf)_2$+0.3 M TBAC in monoglyme electrolyte. Mg//Al—C cells are cycled at a current density of 0.5 $mA/cm^2$ and areal capacity of 0.1 $mAh/cm^2$.

The electrolyte consisting of $Mg(OTf)_2$ salt and TBAC additive in ether solvents demonstrated excellent performance in Mg//Al—C asymmetric cell tests. The Mg//Al—C cell demonstrated high average Coulombic efficiency of 97.5% over 500 cycles, when operated at a current density of 0.5 mA/$cm^2$ and areal capacity of 0.1 mAh/$cm^2$ (FIG. 7*b* and FIG. 8*b*).

Figure 12A:
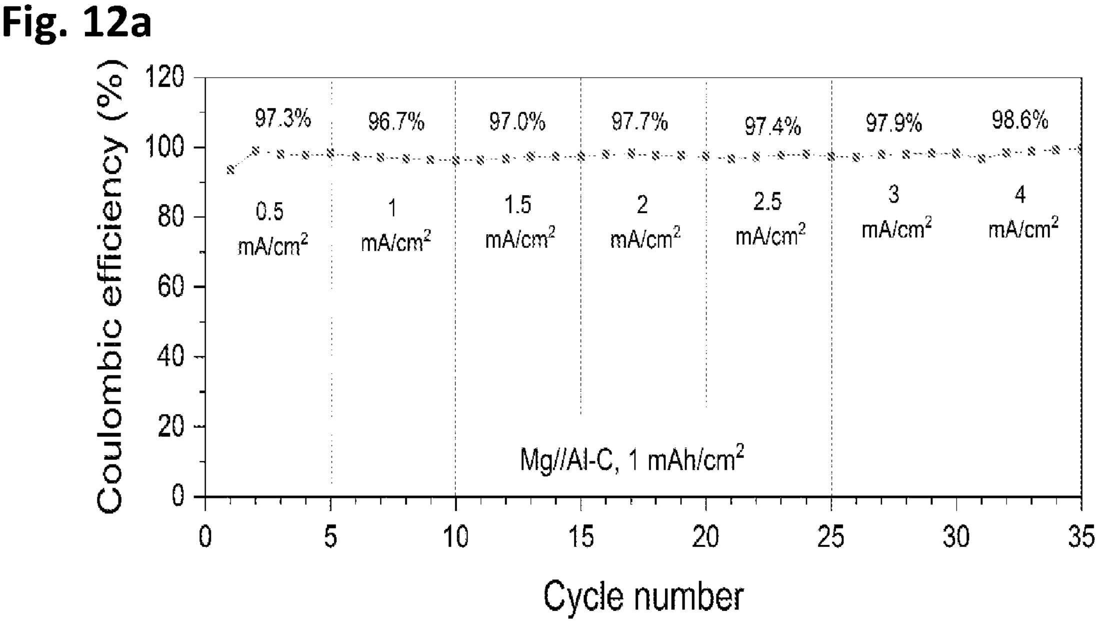
FIG. 12*a* and FIG. 12*b* are plots showing Coulombic efficiency of Mg//Al—C cell cycled at (a) different current densities, and (b) at different areal capacities. All the cells were cycled using 0.5 M $Mg(OTf)_2$+0.3 M TBAC in monoglyme electrolyte.
Figure 12B:
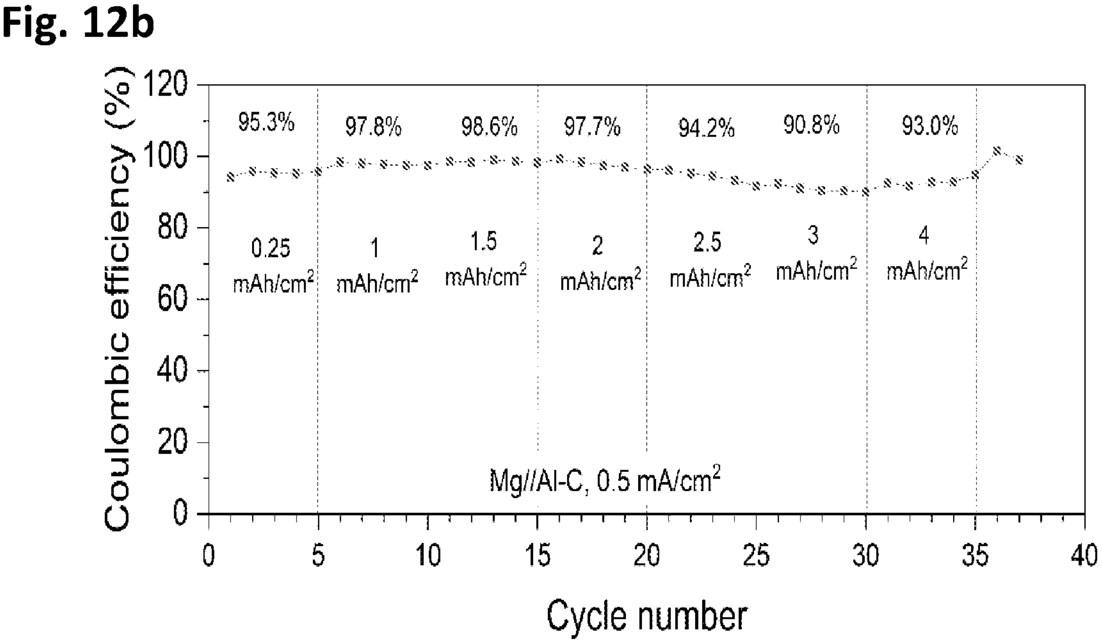

The Mg//Al—C cells were also cycled at various current densities and areal capacities to evaluate their robustness. High current densities translated to high power density, while high areal capacities translated to high energy density. The cells demonstrated excellent rate capability with current density up to 4 mA/$cm^2$ and maintained Coulombic efficiency above 98% (FIG. 12*a*). The Mg//Al—C cells also demonstrated cycling at very high areal capacity up to 5 mAh/$cm^2$ (FIG. 12*b*). These features are important to develop a new Mg-ion battery with high power density and high energy density, respectively.

Figure 14:
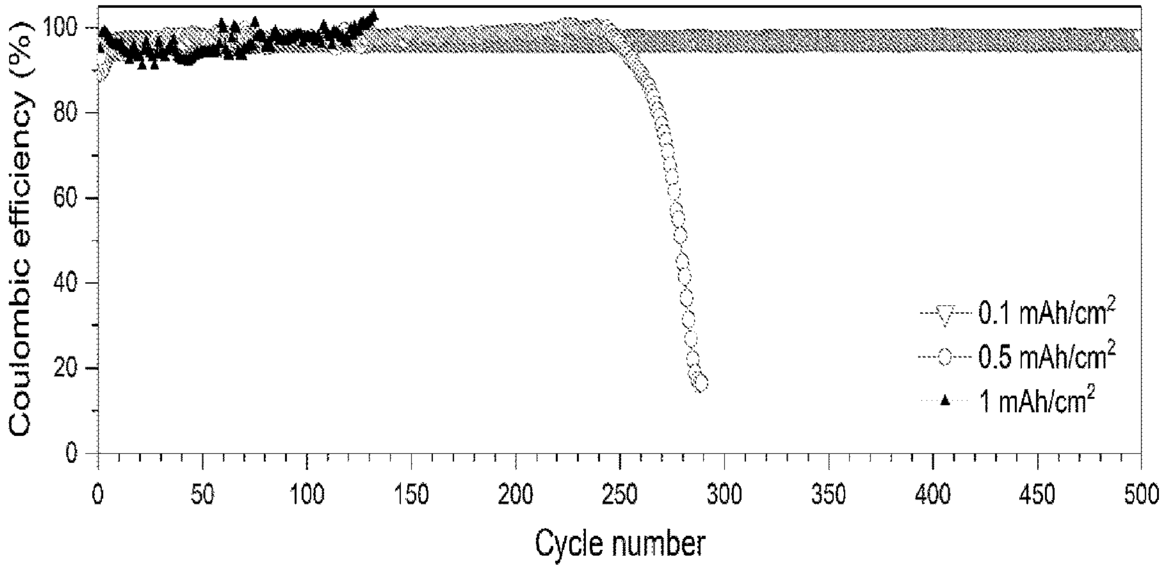
FIG. 14 is a plot showing cycling performance of Mg//Al—C cells using 0.3 M $Mg(OTf)_2$+0.3 M TBAC in monoglyme electrolyte measured at areal capacities of 0.1 mAh/$cm^2$, 0.5 mAh/cm2, and 1 mAh/$cm^2$.

The cycle life of Mg//Al—C cells is significantly dependent on the areal capacity of the plating/stripping process (FIG. 14). At an areal capacity of 0.1 mAh/$cm^2$, the cell showed high Coulombic efficiency and maintained stability over 500 cycles. At higher areal capacities of 0.5 mAh/$cm^2$ and 1 mAh/$cm^2$, the cycle life of Mg//Al—C cells was reduced to 290 and 133 cycles, respectively. This was due to the severe degradation of Mg anode under high areal capacity cycling.

$Mg(OTf)_2$ and $MgCl_2$ in Ether Solvent

The four electrolyte compositions which form clear solutions (Table 1) were examined. The experiments were conducted to evaluate the key technical performance of high-performance electrolyte systems, including Mg plating/stripping Coulombic efficiency and cycle life under different cycling conditions. Here, we present the electrochemical performance of the electrolyte combination of $Mg(OTf)_2$ and $MgCl_2$ in monoglyme solvent. Electrolyte combinations based on other solvents are obtainable by controlling $[Mg^{2+}]:[Cl^-]$ ratio in an ether solvent or mixtures of ether solvent. Table 5 summarizes the key technical features of the designed electrolyte formula.

TABLE 5

The key technical features of 0.3M $Mg(OTf)_2$ + 0.2M $MgCl_2$ in monoglyme electrolyte.

| Key Features | Performance | Remarks |
|---|---|---|
| Mg plating/stripping CE (average) | 99.4% (0.5 mA/$cm^2$ and 0.1 mAh/cm2, 1000 cycles) | Very high Coulombic efficiency |
| Current density | 0.5-2.5 mA/$cm^2$ | Deliver high power density |
| Areal capacity | 0.1-5 mAh/$cm^2$ | Deliver high energy density |
| Cycle life | 1000 cycles (0.1 mAh/$cm^2$) 115 cycles (0.5 mAh/$cm^2$) | Long cycle life |
| Ionic conductivity | 0.34 mS/cm | At room temperature |
| | Maximum of 0.53 mS/cm | 0.6M $Mg(OTf)_2$ + 0.4M $MgCl_2$ in monoglyme |
| Plating potential | −0.17 V vs. $Mg/Mg^{2+}$ | Low overpotential |
| Stripping potential | 0.17 vs. $Mg/Mg^{2+}$ | Low overpotential |
| Anodic stability | 3.5 V vs. $Mg/Mg^{2+}$ on Pt electrode | Good anodic stability |
| Morphology of Mg deposition | Homogeneous, dendrite-free (FIG. 17) | Safe operation |

Figure 8C:
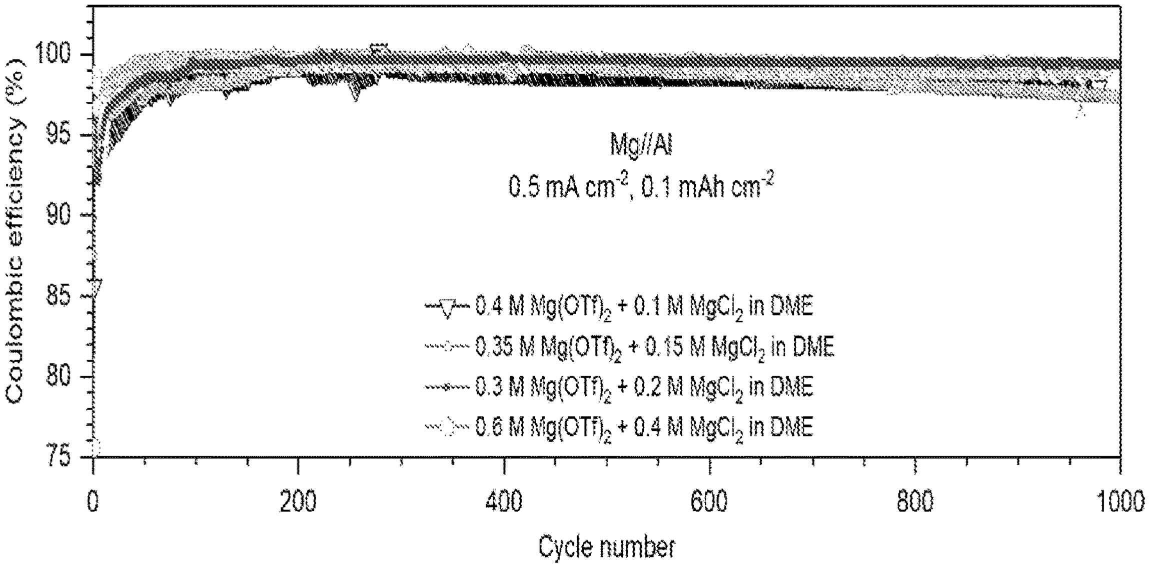
FIG. 8*c* is a plot showing magnesium plating/stripping Coulombic efficiency of Mg//Al—C cells with various [Mg2+]: $[Cl^-]$ ratios in monoglyme. Mg//Al—C cells are cycled at a current density of 0.5 $mA/cm^2$ and areal capacity of 0.1 $mAh/cm^2$.

The electrolyte combination of $Mg(OTf)_2$ salt and $MgCl_2$ in monoglyme demonstrated excellent performance in Mg//Al—C asymmetric cell tests. The combination of 0.3 M $Mg(OTf)_2$ and 0.2 M $MgCl_2$ in monoglyme was found to be the optimal formula for Mg plating/stripping process. The Mg//Al—C cell demonstrated high average Coulombic efficiency of 99.4% over 1000 cycles at a current density of 0.5 mA/$cm^2$ and areal capacity of 0.1 mAh/$cm^2$ (FIG. 8*c*).

Figure 13A:
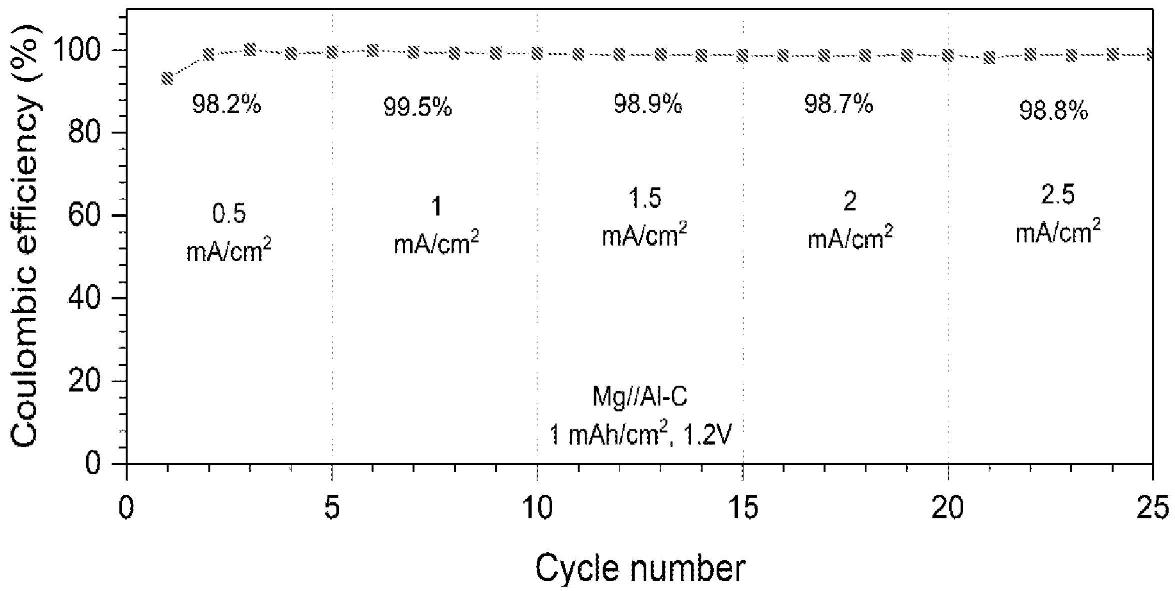
FIG. 13*a* and FIG. 13*b* are plots showing Mg plating/stripping Coulombic efficiency of Mg//Al—C at (a) different current density and (b) different areal capacity. Mg//Al—C cells are cycled with 0.3 M $Mg(OTf)_2$+0.2 M $MgCl_2$ in monoglyme electrolyte.
Figure 13B:
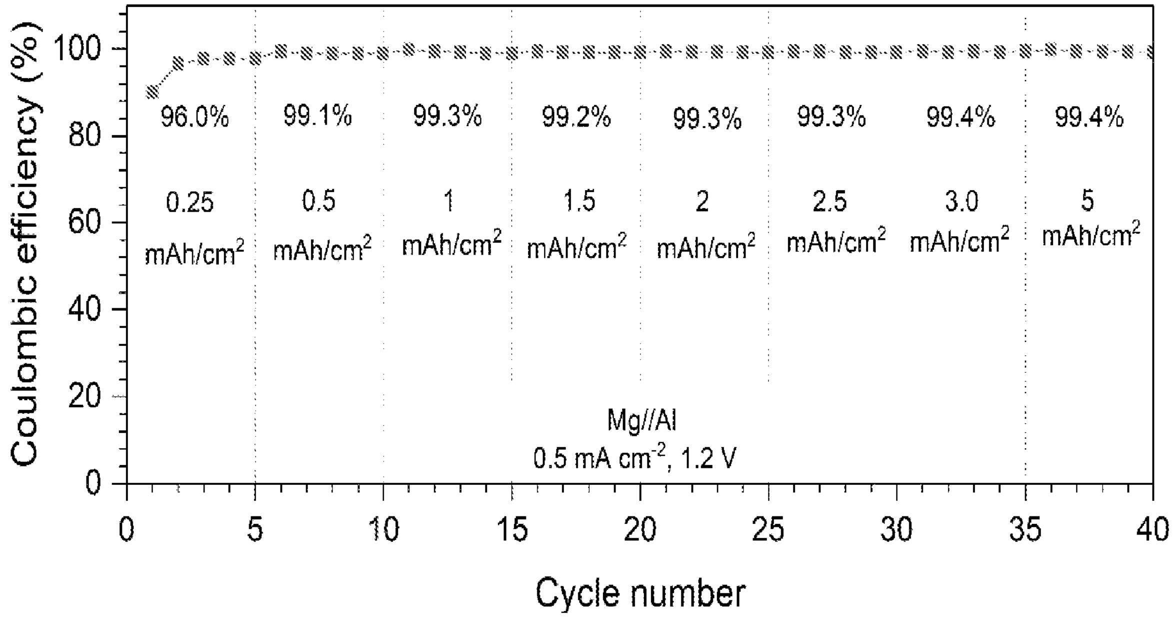

The Mg//Al—C cells were also cycled at various high current densities and high areal capacities to evaluate their robustness for practical application. High current densities translated to high power density, while high areal capacities translated to high energy density. The cells demonstrated excellent rate capability with current density up to 2.5 mA/$cm^2$ and maintained Coulombic efficiency above 98% (FIG. 13*a*). The Mg//Al—C cells also demonstrated a good cycling performance at very high areal capacity up to 5 mAh/$cm^2$ (FIG. 13*b*) with the Coulombic efficiency of 99.4%. These features are important to develop a new Mg-ion battery with high power density and high energy density, respectively.

Figure 15A:
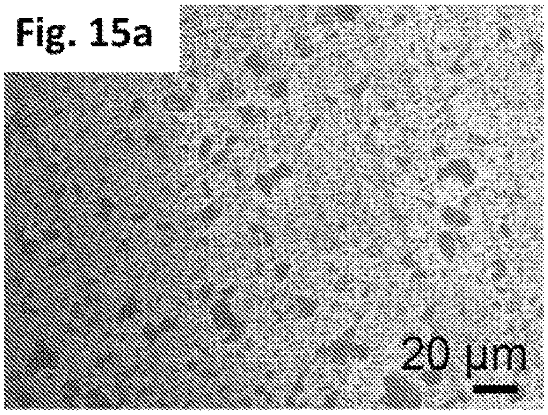
FIG. 15*a* and FIG. 15*b* are scanning electron micrographs of Al—C electrodes (a) before and (b) after Mg deposition cell using $Mg(OTf)_2$+EMImCl in monoglyme electrolyte at an areal capacity of 1 mAh/$cm^2$. The scale bar of these figures is 20 μm.
Figure 15B:
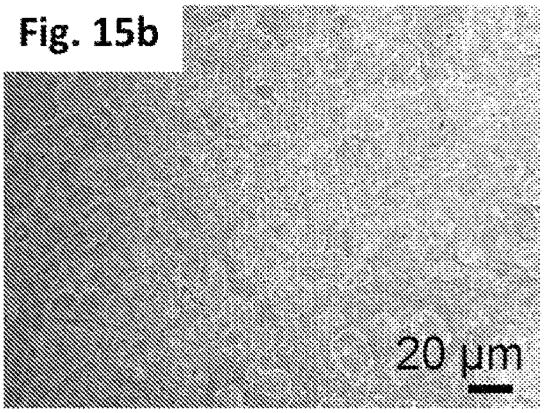

Example 4. Morphology of the Electrodes $Mg(OTf)_2$ and EMImCl in Ether Solvent Examination of Mg deposition film on Al—C electrode revealed uniform and non-dendritic morphologies even at high areal capacity (1 mAh/$cm^2$) before and after Mg deposition (FIG. 15*a* and FIG. 15*b*). This is a sharp contrast to highly dendritic lithium deposit morphologies. The use of $Mg(OTf)_2$-EMImCl electrolyte resulted in homogeneous Mg deposition on Al—C electrode and therefore reduced short-circuit of Al—C//Mg cell caused by Mg dendrite growth.

$Mg(OTf)_2$ and TBAC in Ether Solvent

Figure 16A:
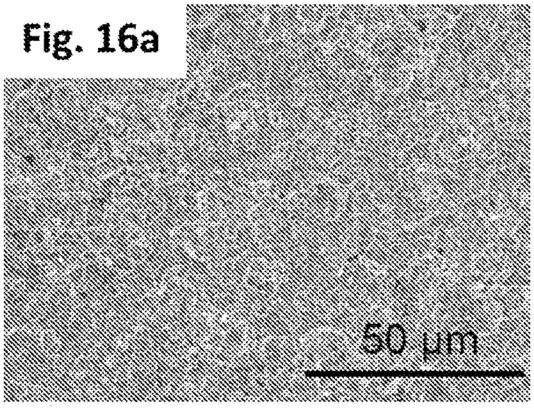
FIG. 16*a* and FIG. 16*b* are scanning electron micrographs showing morphology of deposited Mg film on Al—C electrode using $Mg(OTf)_2$+TBAC in monoglyme electrolyte. Mg film was deposited at current density of 0.5 mA/$cm^2$ for 2 hours (1 mAh/$cm^2$). The scale bar of FIG. 16*a* is 50 μm while the scale bar of FIG. 16*b* is 5 μm.
Figure 16B:
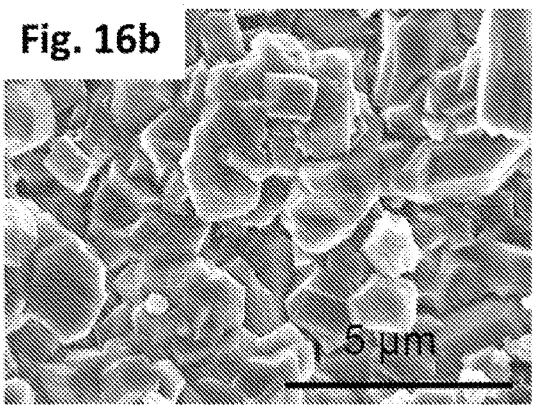

Non-dendritic Mg deposition is an important criterion for safe battery operation. The morphology of a deposited Mg film was examined using scanning electron microscopy (SEM) (FIG. 16*a* and FIG. 16*b*). The magnesium deposits showed non-dendritic crystalline particles associated with uniform metal deposition.

$Mg(OTf)_2$ and $MgCl_2$ in Ether Solvent

Figure 17A:
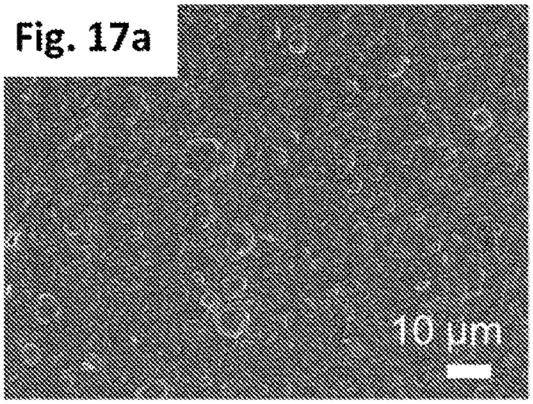
FIG. 17*a* and FIG. 17*b* are scanning electron micrographs showing morphology of deposited Mg film on Al—C electrode using $Mg(OTf)_2+MgCl_2$ in monoglyme electrolyte. Mg film was deposited at current density of 0.5 mA/$cm^2$ for 2 hours (1 mAh/$cm^2$). The scale bar of FIG. 16*a* is 10 μm while the scale bar of FIG. 16*b* is 1 μm.
Figure 17B:
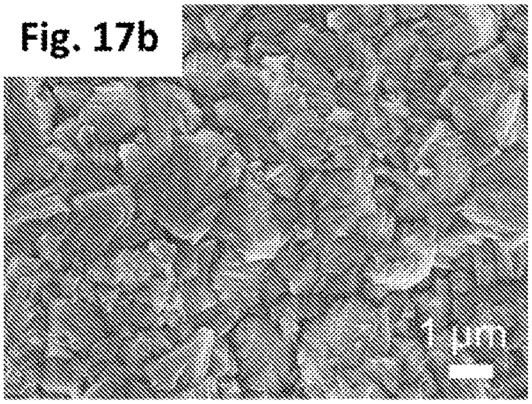

Non-dendritic Mg deposition is also an important criterion for safe battery operation. The morphology of a deposited Mg film was examined using scanning electron microscopy (SEM) (FIG. 17*a* and FIG. 17*b*). The magnesium deposits showed non-dendritic crystalline particles associated with uniform metal deposition.

Figure 18A:
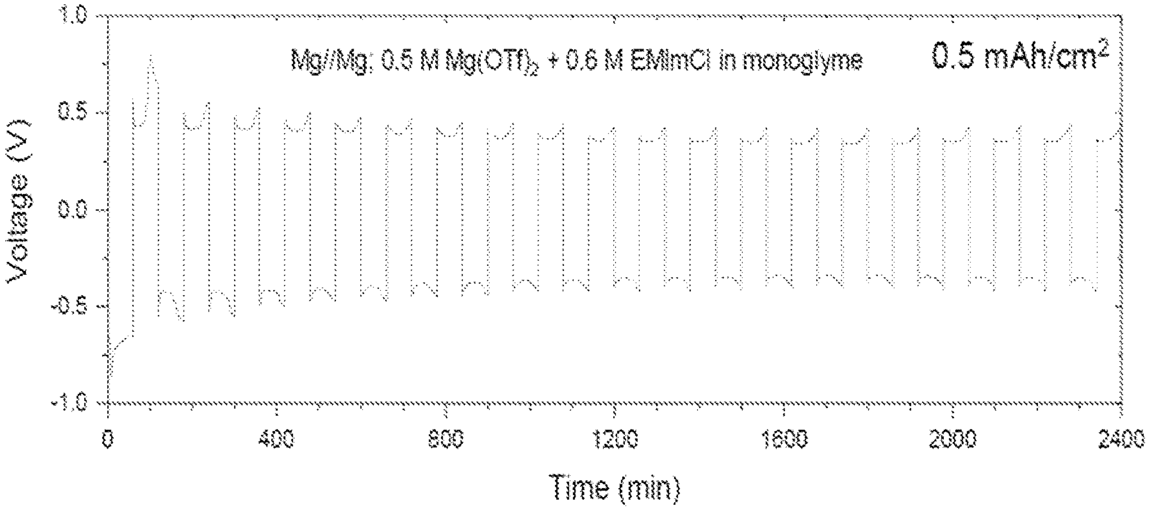
FIG. 18*a* and FIG. 18*b* are plots showing symmetric Mg//Mg cell cycling performance at (a) 0.5 mAh/$cm^2$ and (b) 1 mAh/$cm^2$ in the electrolyte of 0.5 M $Mg(OTf)_2$+0.6 M EMImCl in monoglyme.
Figure 18B:
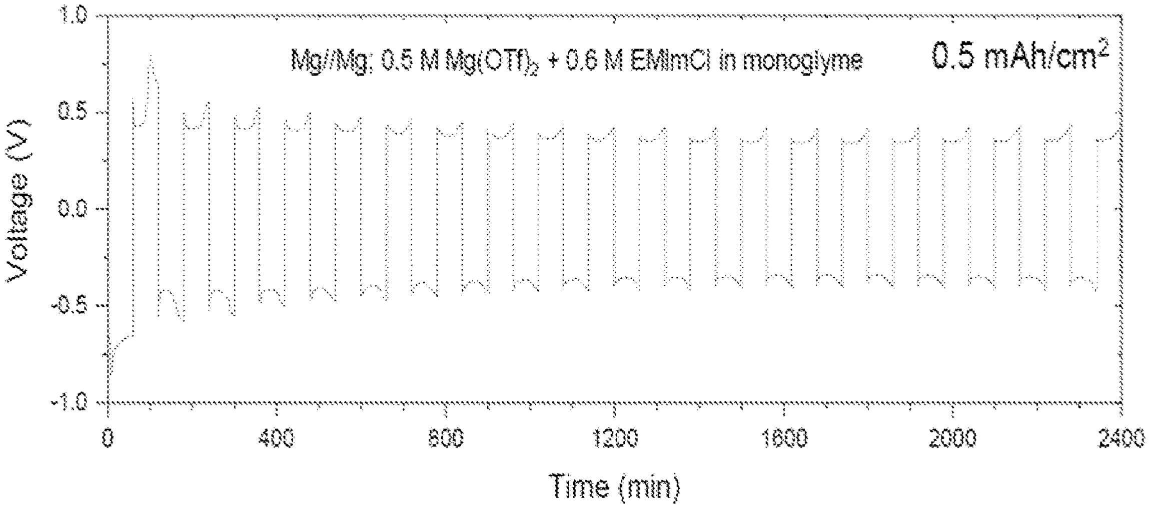

Example 5. Electrochemical Properties Tested with Symmetric Cell $Mg(OTf)_2$ and EMImCl in Ether Solvent Symmetric Mg//Mg cells were employed to further investigate the stability of the Mg metal anode in the 0.5 M $Mg(OTf)_2$+0.6 M EMImCl in monoglyme electrolyte at high areal capacity (FIG. 18). Mg//Mg cells showed reversible plating/stripping processes at 0.5 mAh/$cm^2$ (FIG. 18*a*) and 1 mAh/$cm^2$ (FIG. 18*b*) with overpotential of ±0.35 V and ±0.45 V, respectively. This result consolidates the superior performance of $Mg(OTf)_2$ based electrolytes.

$Mg(OTf)_2$ and TBAC in Ether Solvent

Figure 19:
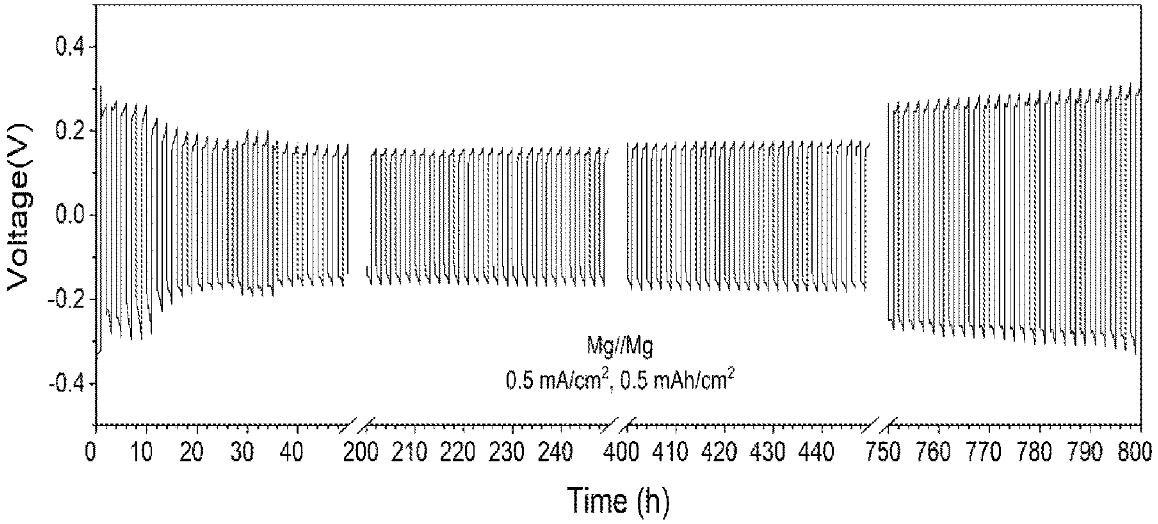
FIG. 19 is a plot showing cell voltage measured during the galvanostatic stripping/plating of a Mg//Mg symmetric cell using 0.5 M $Mg(OTf)_2$+0.3 M TBAC in monoglyme electrolyte. The galvanostatic stripping/plating was conducted at current density of 0.5 mA/$cm^2$ and areal capacity of 0.5 mAh/$cm^2$.

The Mg//Mg symmetric cell also demonstrated excellent cycling performance up to 400 cycles or 800 h (FIG. 19). Reversible plating and stripping were clearly observed near −0.15 V and 0.15 V vs. $Mg/Mg^{2+}$, respectively. The plating/stripping voltage increased only slightly with cycle number, indicating a stable Mg anode interphase in $Mg(OTf)_2$-based electrolyte with TBAC additive.

$Mg(OTf)_2$ and $MgCl_2$ in Ether Solvent

Figure 20:
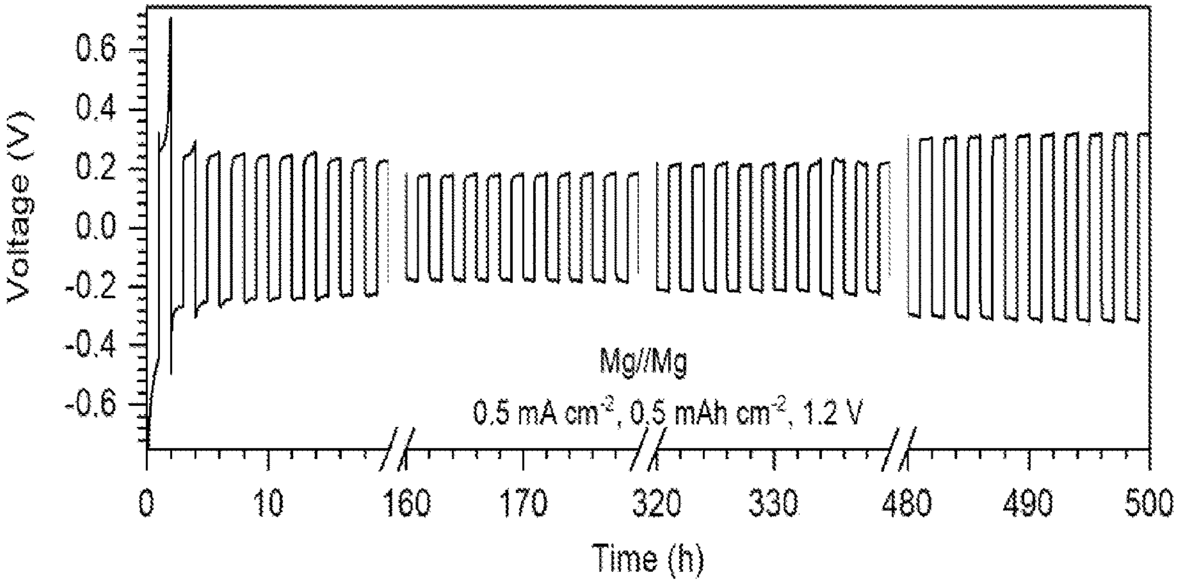
FIG. 20 is a plot showing cell voltage measured during the galvanostatic stripping/plating of a Mg//Mg symmetric cell using 0.3 M $Mg(OTf)_2$+0.2 M $MgCl_2$ in monoglyme electrolyte. The galvanostatic stripping/plating was conducted at areal capacity of 0.5 mAh/$cm^2$ and current density of 0.5 mA/$cm^2$.

The Mg//Mg symmetric cell also demonstrated excellent cycling performance up to 250 cycles or 500 h (FIG. 20). Reversible plating and stripping in symmetric cell were clearly observed near −0.18 V and 0.18 V vs. $Mg/Mg^{2+}$, respectively. The plating/stripping voltage only increased slightly with cycle number, indicating a stable Mg anode interphase in $Mg(OTf)_2$-$MgCl_2$ based electrolyte.

INDUSTRIAL APPLICABILITY

The disclosed electrolyte may be used in electrochemical cells, particularly magnesium ion batteries. As such electrolytes allow efficient plating and stripping of magnesium from a working electrode, such electrolytes may be used for the fabrication and assembly of magnesium-ion batteries which may be used as energy sources in various electrical and electronic devices.

Due to its ease of manufacture, the electrolytes described herein may also be produced on an industrial scale for easy assembly of magnesium ion electrochemical cells, which may be used as an alternative energy storage system to presently available technologies.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A liquid electrolyte composition consisting essentially of:

i) a magnesium salt comprising a trifluoromethane sulfonate anion;

ii) an additive comprising an organic halide salt, an inorganic halide salt or a mixture thereof; and iii) a solvent comprising one or more ethers, wherein the organic halide salt comprises a halide anion and a cation selected from an optionally substituted quaternary ammonium or a three to nine membered N-heterocyclic cation, and the cation comprises at least one protonated nitrogen capable of dissociating the trifluoromethane sulfonate anion from the magnesium salt, and wherein the cation of the inorganic halide salt is a lithium ion, a sodium ion, a cesium ion, a magnesium ion, or a barium ion and the total concentration of the cation and magnesium ions of the magnesium salt divided by the concentration of anions of the inorganic halide salt is greater than 1 in the electrolyte composition.

2. The electrolyte composition of claim 1, wherein the concentration of the magnesium salt is from 0.01 M to 2.5 M.

3. The electrolyte composition of claim 1, wherein the molar ratio of the magnesium salt to the organic halide salt is from 10:1 to 1:10.

4. The electrolyte composition of claim 1, wherein the N-heterocyclic cation is selected from the group consisting of: an optionally substituted three-membered heterocyclic structure, an optionally substituted four-membered heterocyclic structure, an optionally substituted five-membered heterocyclic structure, an optionally substituted six-membered heterocyclic structure, an optionally substituted seven-membered heterocyclic structure, an optionally substituted eight-membered heterocyclic structure, and an optionally substituted nine-membered heterocyclic structure.

5. The electrolyte composition of claim 4, wherein the heterocyclic structure comprises 1, 2, 3, 4, 5, 6, 7, 8, or 9 heteroatoms, said heteroatoms independently selected from the group consisting of nitrogen, oxygen, and sulfur.

6. The electrolyte composition of claim 1, wherein the organic halide salt or inorganic halide salt is selected from the group consisting of fluoride, chloride, bromide and iodide.

7. The electrolyte composition of claim 1, comprising a mixture of at least two or more of said organic halide salts, said organic halide salts being distinct from each other.

8. The electrolyte composition of claim 1, wherein the organic halide salt comprises a quaternary ammonium cation, said cation comprising a structure of $N^+R^1R^2R^3R^4$, wherein each of $R^1$, $R^2$, $R^3$, and $R^4$ may be the same or different and wherein each of $R^1$, $R^2$, $R^3$, and $R^4$ is independently an optionally substituted alkyl group.

9. The electrolyte composition of claim 1, wherein the organic halide salt is 1-ethyl-3-methylimidazolium chloride or tetrabutylammonium chloride.

10. The electrolyte composition of claim 1, wherein the concentration of the organic halide salt or the concentration of the inorganic halide salt is from 0.01 M to 10 M.

11. The electrolyte composition of claim 1, wherein the inorganic halide salt is selected from the group consisting of lithium chloride (LiCl), sodium chloride (NaCl), cesium chloride (CsCl), magnesium chloride ($MgCl_2$), and barium chloride ($BaCl_2$).

12. The electrolyte composition of claim 1, wherein the total concentration of the cations of the inorganic halide salt and magnesium ions of the magnesium salt divided by the concentration of anions of the inorganic halide salt in the electrolyte composition is in the range of greater than 1 to 5.

13. The electrolyte composition of claim 1, wherein the concentration of the magnesium trifluoromethanesulfonate is from 0.01 M to 1.5 M.

14. A liquid electrolyte composition consisting essentially of:

i) a magnesium trifluoromethanesulfonate;

ii) 1-ethyl-3-methylimidazolium chloride, tetrabutylammonium chloride, or a mixture thereof, and iii) a solvent comprising 1,2-dimethoxyethane.

15. The electrolyte composition of claim 14, wherein the concentration of the magnesium trifluoromethanesulfonate salt is 2.5 M.

16. A liquid electrolyte composition consisting essentially of:

i) magnesium trifluoromethanesulfonate;

ii) magnesium chloride; and iii) a solvent comprising 1,2-dimethoxyethane, wherein the magnesium ions and the chloride ions are present in the electrolyte composition in a $[Mg^{2+}]:[Cl^-]$ ratio of from >1:1 to about 5:1.

17. The electrolyte composition of claim 16, wherein the concentration of the magnesium trifluoromethanesulfonate salt is 1.5 M.

18. The electrolyte composition of claim 1, wherein the solvent does not comprise water.

19. An electrochemical cell comprising:

a) a positive electrode;

b) a magnesium negative electrode; and c) a liquid electrolyte composition consisting essentially of:

(i) a magnesium salt comprising a trifluoromethane sulfonate anion;

(ii) an additive comprising an organic halide salt, an inorganic halide salt or a mixture thereof; and iii) a solvent comprising one or more ethers, wherein the organic halide salt comprises a halide anion and a cation selected from an optionally substituted quaternary ammonium or a three to nine membered N-heterocyclic cation, and the cation comprises at least one protonated nitrogen capable of dissociating the trifluoromethane sulfonate anion from the magnesium salt, and wherein the cation of the inorganic halide salt is a lithium ion, a sodium ion, a cesium ion, a magnesium ion, or a barium ion and the total concentration of the cation and magnesium ions of the magnesium salt divided by the concentration of anions of the inorganic halide salt is greater than 1 in the electrolyte composition, wherein the positive electrode and the magnesium negative electrode are in fluid communication with the electrolyte.

* * * * *